(12) United States Patent
Mizusaki et al.

(10) Patent No.: US 11,332,106 B2
(45) Date of Patent: May 17, 2022

(54) ELECTRIC BOOSTER AND BRAKE CONTROL DEVICE

(71) Applicant: HITACHI AUTOMOTIVE SYSTEMS, LTD., Hitachinaka (JP)

(72) Inventors: Takanori Mizusaki, Atsugi (JP); Yasufumi Konishi, Atsugi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 70 days.

(21) Appl. No.: 16/767,284

(22) PCT Filed: Nov. 21, 2018

(86) PCT No.: PCT/JP2018/042927
§ 371 (c)(1),
(2) Date: May 27, 2020

(87) PCT Pub. No.: WO2019/107235
PCT Pub. Date: Jun. 6, 2019

(65) Prior Publication Data
US 2020/0324744 A1    Oct. 15, 2020

(30) Foreign Application Priority Data

Nov. 28, 2017 (JP) .............................. JP2017-227815

(51) Int. Cl.
*B60T 13/74* (2006.01)
*B60T 8/171* (2006.01)
(Continued)

(52) U.S. Cl.
CPC .............. *B60T 8/171* (2013.01); *B60T 7/042* (2013.01); *B60T 13/745* (2013.01);
(Continued)

(58) Field of Classification Search
CPC ............. B60T 13/745; B60T 2270/413; B60T 2270/414
See application file for complete search history.

(56) References Cited

U.S. PATENT DOCUMENTS 10,597,015 B2 * 3/2020 Mizusaki ................ B60T 13/74
2005/0269870 A1 * 12/2005 Ohashi .................. H02J 7/1423
303/20

(Continued)

FOREIGN PATENT DOCUMENTS

JP        2009-143265        7/2009

OTHER PUBLICATIONS

International Search Report dated Jan. 15, 2019 in International (PCT) Application No. PCT/JP2018/042927, with English translation.

(Continued)

*Primary Examiner* — Bradley T King
(74) *Attorney, Agent, or Firm* — Wenderoth, Lind & Ponack, L.L.P.

(57) ABSTRACT

A master pressure control device of an electric booster sets an upper limit of current supplied to an electric motor in accordance with an operation amount of an input member to a current limit value A when a condition for limiting the driving of the electric motor is satisfied due to a decrease of voltage of a vehicle power source. The master pressure control device sets the upper limit of the current supplied to the electric motor in accordance with the operation amount of the input member to a current limit value B when the condition for limiting the driving of the electric motor is cancelled due to restoration of the voltage of the vehicle power source to normal while a brake pedal is operated. The current limit value B is larger than the current limit value A used when the driving of the electric motor is limited.

12 Claims, 10 Drawing Sheets

(51) Int. Cl.
*B60T 7/04* (2006.01)
*B60T 17/22* (2006.01)

(52) U.S. Cl.
CPC ......... *B60T 17/221* (2013.01); *B60T 2250/00* (2013.01); *B60T 2270/82* (2013.01)

(56) References Cited

U.S. PATENT DOCUMENTS

| | | | | |
|---|---|---|---|---|
| 2010/0062897 | A1* | 3/2010 | Nishino | B60T 7/042 |
| | | | | 477/29 |
| 2011/0266106 | A1* | 11/2011 | Suzuki | B60T 8/4081 |
| | | | | 188/360 |
| 2015/0008726 | A1* | 1/2015 | Minami | B60L 7/18 |
| | | | | 303/14 |
| 2015/0246675 | A1* | 9/2015 | Matsunaga | B60W 30/02 |
| | | | | 701/70 |
| 2016/0355170 | A1* | 12/2016 | Yasui | B60T 13/746 |
| 2017/0036659 | A1* | 2/2017 | Murakami | B60T 13/662 |
| 2017/0349153 | A1* | 12/2017 | Yamashita | H02P 1/18 |
| 2019/0283723 | A1* | 9/2019 | Hitzel | B60T 8/36 |
| 2020/0172064 | A1* | 6/2020 | Yasui | B60T 7/042 |
| 2021/0001829 | A1* | 1/2021 | Seol | B60T 17/22 |
| 2021/0269004 | A1* | 9/2021 | Krautter | B60T 13/745 |

OTHER PUBLICATIONS

Written Opinion of the International Searching Authority dated Jan. 15, 2019 in International (PCT) Application No. PCT/JP2018/042927, with English translation.

* cited by examiner

ELECTRIC BOOSTER AND BRAKE CONTROL DEVICE

TECHNICAL FIELD

The invention relates to an electric booster that provides a braking force to a vehicle, such as an automobile, and also relates to a brake control device.

BACKGROUND ART

Boosters (brake boosters) known as those installed in vehicles, such as automobiles, are electric boosters using electric actuators. Patent Literature 1 refers to a brake control device configured so that, when source voltage is restored from a state detected as abnormal due to a source voltage decrease, the brake is restored to a normal state while the brake pedal is not pressed to avoid an adverse effect on brake feeling (fluctuation in braking force).

CITATION LIST

Patent Literature

PTL 1: Japanese Unexamined Patent Application Publication (Kokai) No. 2009-143265

SUMMARY OF INVENTION

Technical Problem

In the technology mentioned in Patent Literature 1, even if the source voltage is restored, the brake is not restored to the normal state as long as the brake pedal is pressed. The braking force then remains in the decreased state, which might make the operator (driver) feel that the braking force is insufficient. According to the technology mentioned in Patent Literature 1, therefore, the operator might have uncomfortable feeling when electric-actuator driving limitation is cancelled due to the source voltage decrease or the like.

Solution to Problem

An object of the invention is to provide an electric booster and a brake control device, which are capable of repressing uncomfortable feeling given to an operator when limitation on driving of an electric actuator is cancelled.

An electric booster according to one embodiment of the invention includes an input member configured to be advanced and retracted by operation of a brake pedal; a piston arranged in the input member so as to be relatively movable; an electric actuator configured to advance and retract the piston; and a control device configured to control driving of the electric actuator in accordance with amount of operation of the input member by the brake pedal. In the electric booster that generates hydraulic brake pressure in a master cylinder through the motion of the piston and supplies the hydraulic brake pressure to a hydraulic channel, the control device limits the driving of the electric actuator in accordance with the operation amount of the input member if a condition for limiting the driving of the electric actuator is satisfied, and makes current for driving the electric actuator in accordance with the operation amount of the input member higher than when the driving of the electric actuator is limited and yet lower than when the driving of the electric actuator is not limited if the condition for limiting the driving of the electric actuator is cancelled during the operation of the brake pedal.

A brake control device according to another embodiment of the invention drives an electric actuator in accordance with a braking demand, produces deceleration, and limits current supplied to the electric actuator in response to the braking demand to a predetermined current value or smaller if a condition for limiting driving of the electric actuator is satisfied. If the condition for limiting the driving of the electric actuator is cancelled during operation of a brake pedal, the current supplied to the electric actuator in response to the braking demand is made higher than the predetermined current value and yet lower than when the driving of the electric actuator is not limited.

The electric booster and the brake control device according to the embodiments of the invention are capable of repressing uncomfortable feeling given to the operator when the limitation on the driving of the electric actuator is cancelled during the limitation on the driving of the electric actuator.

DESCRIPTION OF EMBODIMENTS

Figure 1:
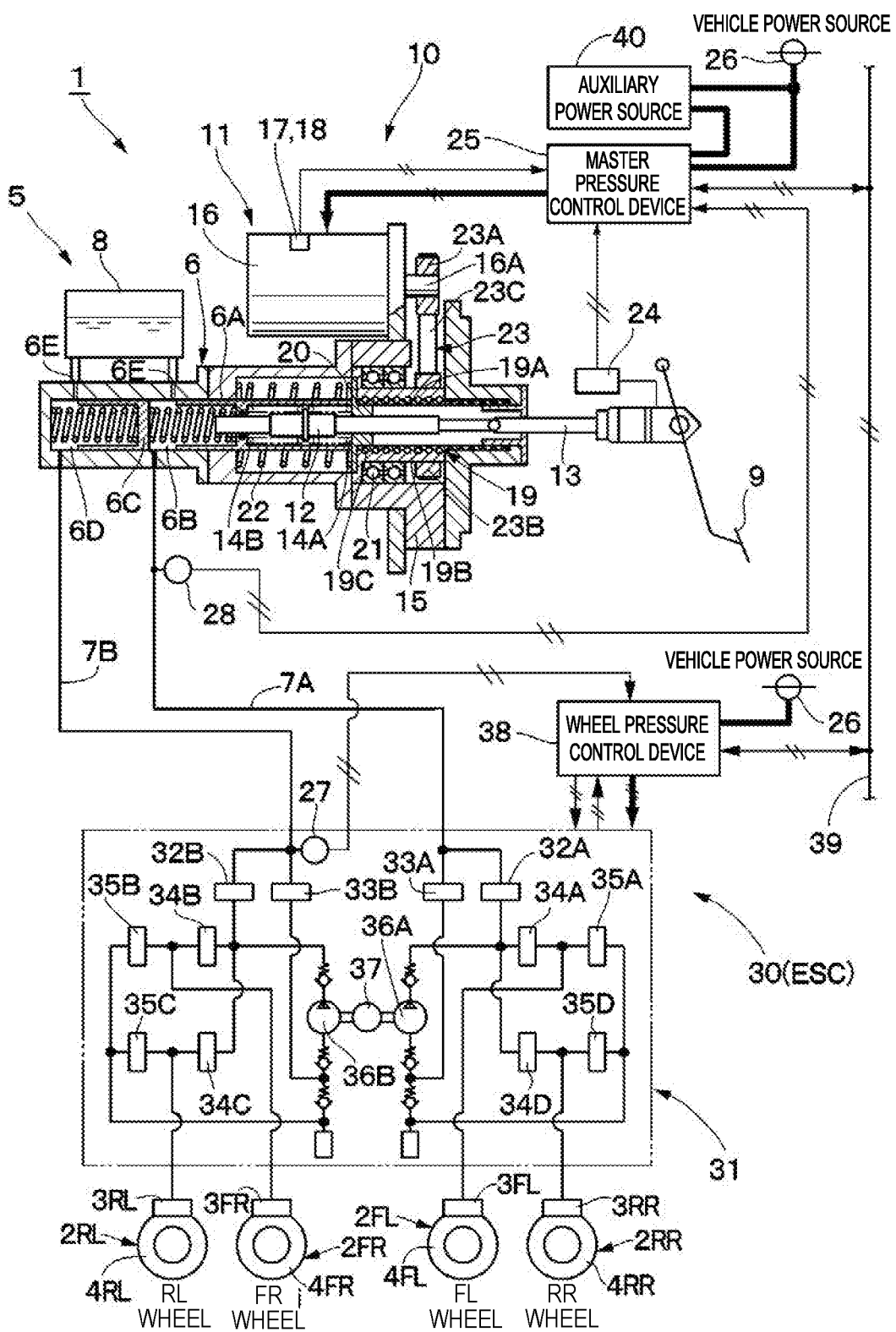
FIG. 1 is a configuration diagram of a vehicle brake system including an electric booster according to embodiments.
Figure 3:
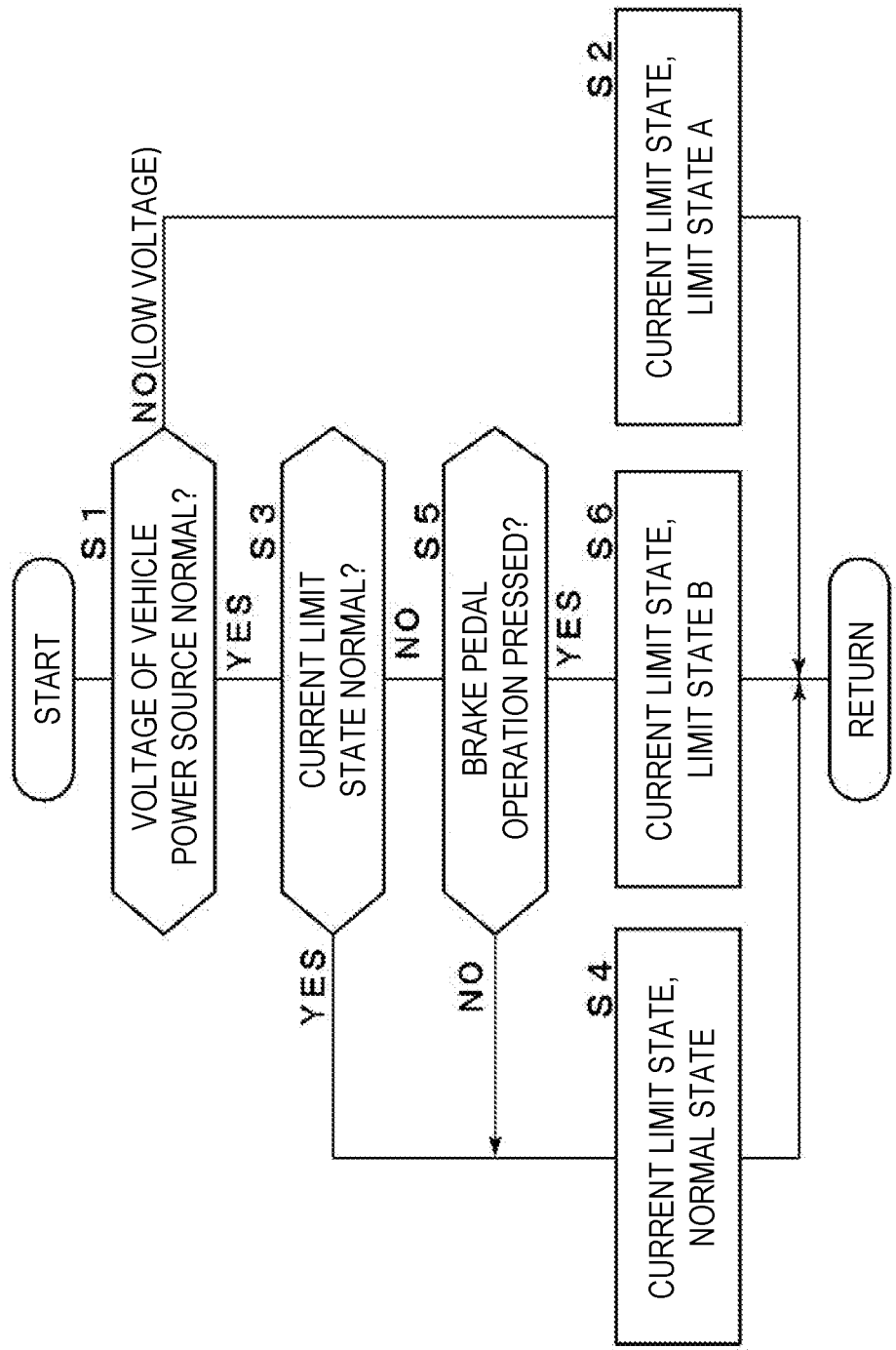
FIG. 3 is a flowchart showing contents of control implemented by the master pressure control device according to a first embodiment.
Figure 7:
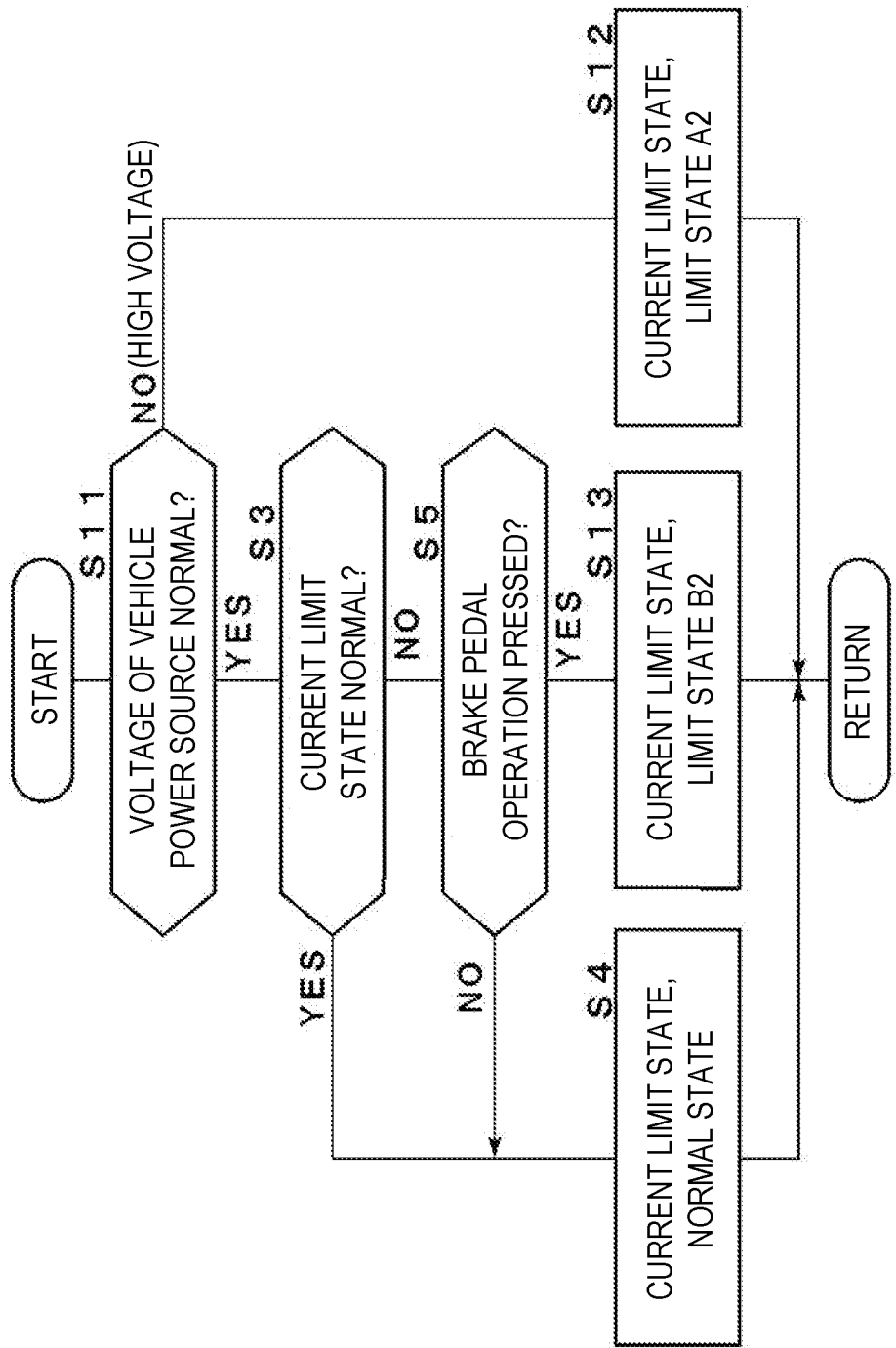
FIG. 7 is a flowchart showing contents of control implemented by a master pressure control device according to a second embodiment.
Figure 9:
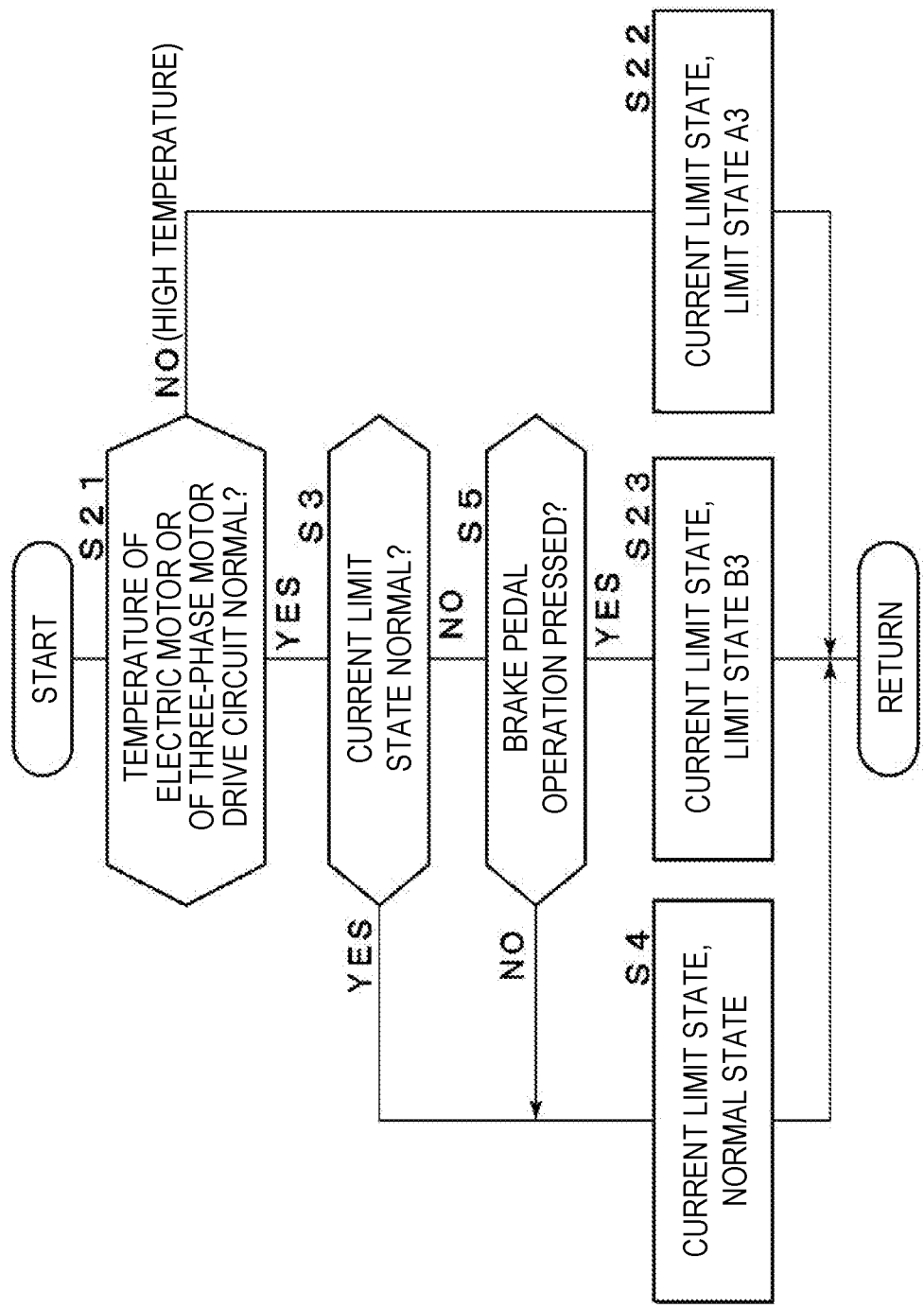
FIG. 9 is a flowchart showing contents of control implemented by a master pressure control device according to a third embodiment.

An electric booster and a brake control device according to embodiments will be discussed in detail with reference to the attached drawings, taking as an example a case where the electric booster and the brake control device are installed in a four-wheel automobile. Steps of flowcharts shown in FIGS. 3, 7 and 9 are represented as a letter "S" (for example, Step 1 is represented as "S1"). In FIG. 1, lines with double slashes represent electric system lines including signal lines (thin lines), power lines (thick lines), and other like lines.

FIGS. 1 to 4 show a first embodiment. Referring to FIG. 1, an automobile that is a vehicle is equipped with a brake system 1 for providing a braking force to four wheels including a left front wheel (FL), a right rear wheel (RR), a right front wheel (FR), and a left rear wheel (RL). The brake system 1 comprises hydraulic brake devices 2FL, 2RR, 2FR, and 2RL that are brake mechanisms respectively provided to the wheels (FL, RR, FR, RL) and a brake control system 5 configured to supply hydraulic brake pressure to the hydraulic brake devices 2FL, 2RR, 2FR, and 2RL. The brake control system 5 is intended to control the braking force applied to the wheels (FL, RR, FR, RL).

The brake control system 5 includes a master cylinder 6; a master pressure control mechanism 11 including an electric motor 16 for controlling master pressure that is hydraulic brake pressure generated by the master cylinder 6; a master pressure control device 25 that is a control device (brake control device) for electrically controlling the master pressure control mechanism 11; a wheel pressure control mechanism 31 configured to supply hydraulic brake pressure to the hydraulic brake devices 2FL, 2RR, 2FR and 2RL; and a wheel pressure control device 38 for electrically controlling the wheel pressure control mechanism 31. The brake control system 5 further includes a reservoir tank 8, a brake pedal 9, an input member 13, a brake operation amount detection device 24, and a vehicle power source 26.

The hydraulic brake devices 2FL, 2RR, 2FR and 2RL are constructed as hydraulic disc brakes. More specifically, the hydraulic brake devices 2FL, 2RR, 2FR and 2RL comprise wheel cylinders 3FL, 3RR, 3FR and 3RL, respectively, which each include a cylinder (caliper), a piston, and brake pads. The hydraulic brake devices 2FL, 2RR, 2FR and 2RL are so configured that the pistons are propelled by the hydraulic brake pressure supplied from the master pressure control mechanism 11 and/or the wheel pressure control mechanism 31. This propulsion of the pistons causes respective pairs of brake pads to press disc rotors 4FL, 4RR, 4FR and 4RL in such a manner as to hold the disc rotors 4FL, 4RR, 4FR and 4RL therebetween. The disc rotors 4FL, 4RR, 4FR and 4RL rotate integrally with the respective wheels (FL, RR, FR, RL). When the disc rotors 4FL, 4RR, 4FR and 4RL are pressed by the respective pairs of brake pads, a friction braking force is generated between the disc rotors 4FL, 4RR, 4FR and 4RL on one side and the respective pairs of brake pads on the other. As a result of the generation of the friction braking force, brake torque acts on the disc rotors 4FL, 4RR, 4FR and 4RL, and a braking force (brake force) is then provided to between the wheels (FL, RR, FR, RL) and a road surface.

The master cylinder 6 is of a tandem type with two pressurization chambers including a primary fluid chamber 6B that is pressurized by a primary piston 6A and an input piston 12 and a secondary fluid chamber 6D that is pressurized by a secondary piston 6C. The master cylinder 6 is so configured that when the primary piston 6A (and the input piston 12) is propelled, the secondary piston 6C is also propelled, and the propulsion of the primary piston 6A and the secondary piston 6C pressurizes brake fluid in the primary fluid chamber 6B and the secondary fluid chamber 6D. The pressurized brake fluid passes through a primary pipe 7A that is a master pipe, a secondary pipe 7B, and the wheel pressure control mechanism 31 to be supplied to the hydraulic brake devices 2FL, 2RR, 2FR and 2RL. The wheels (FL, RR, FR, RL) are thus provided with the braking force. In short, deceleration is produced in the vehicle.

The reservoir tank 8 is connected to the primary fluid chamber 6B and the secondary fluid chamber 6D through reservoir ports 6E, 6E of the master cylinder 6. When the primary piston 6A and the secondary piston 6C are in retracted positions, the reservoir ports 6E, 6E bring the primary fluid chamber 6B and the secondary fluid chamber 6D into communication with the reservoir tank 8 to properly replenish the reservoir tank 8 with the brake fluid. When the primary piston 6A and the secondary piston 6C are advanced, the reservoir ports 6E, 6E disconnect the primary fluid chamber 6B and the secondary fluid chamber 6D from the reservoir tank 8 to allow the primary fluid chamber 6B and the secondary fluid chamber 6D to be pressurized.

As described above, the two pistons, namely the primary piston 6A and the secondary piston 6C, are used to supply the brake fluid through the primary pipe 7A and the secondary pipe 7B to a dual hydraulic circuit. If one of the hydraulic circuits fails, hydraulic pressure still can be supplied using the other hydraulic circuit, which ensures the baking force.

The master pressure control mechanism 11, together with the master pressure control device 25, forms an electric booster 10. The master pressure control mechanism 11 includes a piston formed integrally with the primary piston 6A (hereinafter, referred to as the primary piston 6A); the input piston 12; the input member 13; a pair of springs 14A and 14B; a housing 15 forming an outer shell of the master pressure control mechanism 11; the electric motor 16 functioning as an electric actuator (motor) for driving the primary piston 6A; a ball screw mechanism 19 functioning as a rotation-linear motion converting mechanism which is interposed between the primary piston 6A and the electric motor 16; and a belt reduction mechanism 23 functioning as a deceleration mechanism. The electric motor 16 includes a rotational position sensor (rotational angle sensor) 17 configured to detect a rotational position (rotational angle) of the electric motor 16. The electric motor 16 further includes a temperature sensor 18 configured to detect temperature of the electric motor 16.

The primary piston 6A is so disposed as to be relatively movable to the input piston 12 and the input member 13. According to the embodiments, the primary piston 6A corresponds to a piston located on a primary side of the master cylinder 6 and at the same time corresponds to a piston of the master pressure control mechanism 11. In other words, according to the embodiments, the piston on the primary side of the master cylinder and the piston of the master pressure control mechanism 11 are integrally formed into a single piston, namely the primary piston 6A. The primary piston 6A, together with the input piston 12, forms the piston on the primary side of the master cylinder 6. Although not illustrated, the piston of the master pressure control mechanism (power piston) and the piston on the primary side of the master cylinder (primary piston) may be separated.

The input piston 12 is so arranged as to extend through a center portion of the primary piston 6A. The input piston 12 is disposed to be slidable relative to the primary piston 6A in a liquid-tight manner. The input piston 12 is so arranged that a distal end portion of the input piston 12 faces the inside of the primary fluid chamber 6B. The input piston 12 has a rear end portion to which the input member 13 is coupled. The input member 13 extends from a rear end portion of the master pressure control mechanism 11 toward the inside of an operation chamber of a vehicle body. The brake pedal 9 is coupled to an end portion on an extended side of the input member 13. The input member 13 is advanced and retracted by operation of the brake pedal 9.

The pair of springs 14A and 14B is interposed between the primary piston 6A and the input piston 12. The springs 14A and 14B use spring forces thereof to elastically maintain the primary piston 6A and the input piston 12 at balanced positions. In other words, the spring forces of the springs 14A and 14B act on the primary piston 6A and the input piston 12 in accordance with axial relative displacement of the primary piston 6A and the input piston 12.

The electric motor 16 is an electric actuator (motor) that advances and retracts the primary piston 6A. The electric motor 16 is actuated by a rotational position command issued from the master pressure control device 25 to be driven to a desired rotational position. The electric motor 16 may comprise, for example, a publicly-known DC motor, DC brushless motor, AC motor or the like. According to the embodiments, the electric motor 16 comprises a three-phase DC brushless motor in light of controllability, silentness, durability, and the like. The rotational position sensor 17 is connected to the master pressure control device 25. The temperature sensor 18 is also connected to the master pressure control device 25. The master pressure control device 25 is capable of calculating a propelling amount of the ball screw mechanism 19, that is, a displacement amount of the primary piston 6A on the basis of a signal (rotational position information) of the rotational position sensor 17. The master pressure control device 25 is further capable of determining malfunction of the electric motor 16 (for example, whether the temperature of the electric motor 16 is within an allowable range) on the basis of a signal (temperature information) of the temperature sensor 18.

The ball screw mechanism 19 includes a screw shaft 19A that is a hollow linear motion member in which the input member 13 is inserted, a nut member 19B that is a cylindrical rotary member in which the screw shaft 19A is inserted, and a plurality of balls 19C made of steel balls, which are fitted in a thread groove formed between the screw shaft 19A and the nut member 19B. The nut member 19B has a front end portion in contact with a rear end portion of the primary piston 6A with a movable member 20 intervening therebetween. The nut member 19B is rotatably supported by a bearing 21 disposed in the housing 15. The ball screw mechanism 19 is so configured that when the nut member 19B is rotated by the electric motor 16 through the belt reduction mechanism 23, the balls 19C roll in the thread groove, and the screw shaft 19A makes a linear motion. The primary piston 6A is then pressed through the movable member 20. The screw shaft 19A is biased toward a retracted position by a retractor spring 22 through the movable member 20.

The rotation-linear motion converting mechanism may be another mechanism, such as a rack-and-pinion mechanism, as long as the mechanism is capable of converting a rotational motion of the electric motor 16 (that is, the belt reduction mechanism 23) into a linear motion and transmits the linear motion to the primary piston 6A. According to the embodiments, the rotation-linear motion converting mechanism comprises the ball screw mechanism 19 in light of low backlash, efficiency, durability, and the like. The ball screw mechanism 19 has a back drivability and is capable of rotating the nut member 19B through the linear motion of the screw shaft 19A. The screw shaft 19A is designed to come into contact with the primary piston 6A from a rear side and enable the primary piston 6A to be detached from the screw shaft 19A and advance on its own.

If the electric motor 16 becomes unactuatable due to disconnection or the like during the actuation of the brake, that is, while the hydraulic brake pressure is generated in the master cylinder 6, the screw shaft 19A is returned to the retracted position by the spring force of the return spring 22. This releases the hydraulic pressure of the master cylinder 6 and represses a brake drag. The primary piston 6A is designed to be separated away from the screw shaft 19A and move on its own. If the electric motor 16 is unactuatable, therefore, the input piston 12 is advanced by the brake pedal 9 through the input member 13 and brought into contact with the primary piston 6A. The primary piston 6A is thus operated in a direct manner, to thereby generate the hydraulic pressure. This allows a controlling function to be maintained even if the electric motor 16 becomes unactuatable.

The belt reduction mechanism 23 reduces the rotation of an output shaft 16A of the electric motor 16 at a predetermined reduction ratio and transfers the result to (the nut member 19B of) the ball screw mechanism 19. The belt reduction mechanism 23 includes a drive pulley 23A fitted to the output shaft 16A of the electric motor 16, a driven pulley 23B fitted to an outer peripheral portion of the nut member 19B of the ball screw mechanism 19, and a belt 23C looped over the drive pulley 23A and the driven pulley 23B. The belt reduction mechanism 23 may be combined with another reduction mechanism, such as a gear reduction mechanism. Instead of the belt reduction mechanism 23, it is also possible to utilize a publicly-known gear reduction mechanism, chain reduction mechanism, differential reduction mechanism or the like. If a sufficiently large torque can be obtained by the electric motor 16, it is possible to use the electric motor 16 to directly drive the ball screw mechanism 19 without using a reduction mechanism. This makes it possible to repress various problems associated with reliability, silentness, installability and the like, which are caused by the interposition of the reduction mechanism.

The brake operation amount detection device 24 is coupled to the input member 13. The brake operation amount detection device 24 is configured as a detection device (displacement sensor, for example) that detects at least a position or a displacement amount (stroke) of the input member 13. The brake operation amount detection device 24 may be a detection device that detects the displacement amount of the input member 13, a stroke amount of the brake pedal 9, a motion angle of the brake pedal 9, pedal effort of the brake pedal 9 or a combination of a plurality of pieces of the operation amount information mentioned above as the brake operation amount (physical amount) to be detected.

For example, the brake operation amount detection device 24 may include a plurality of position sensors including a displacement sensor that detects the displacement amount of the input member 13 or a plurality of effort sensors that detect the pedal effort of the brake pedal 9, which is applied by the operator. In other words, the brake operation amount detection device 24 may be configured by combining a plurality of displacement sensors of the input member 13, combining a plurality of pedal effort sensors that detect the pedal effort of the brake pedal 9 or combining the displacement sensors and the pedal effort sensors. If the brake operation amount detection device 24 is thus configured, in the event that a signal to be transmitted from one of the sensors is ceased, the other sensors detect and recognize a braking demand of the operator. Therefore, failsafe is ensured.

Figure 2:
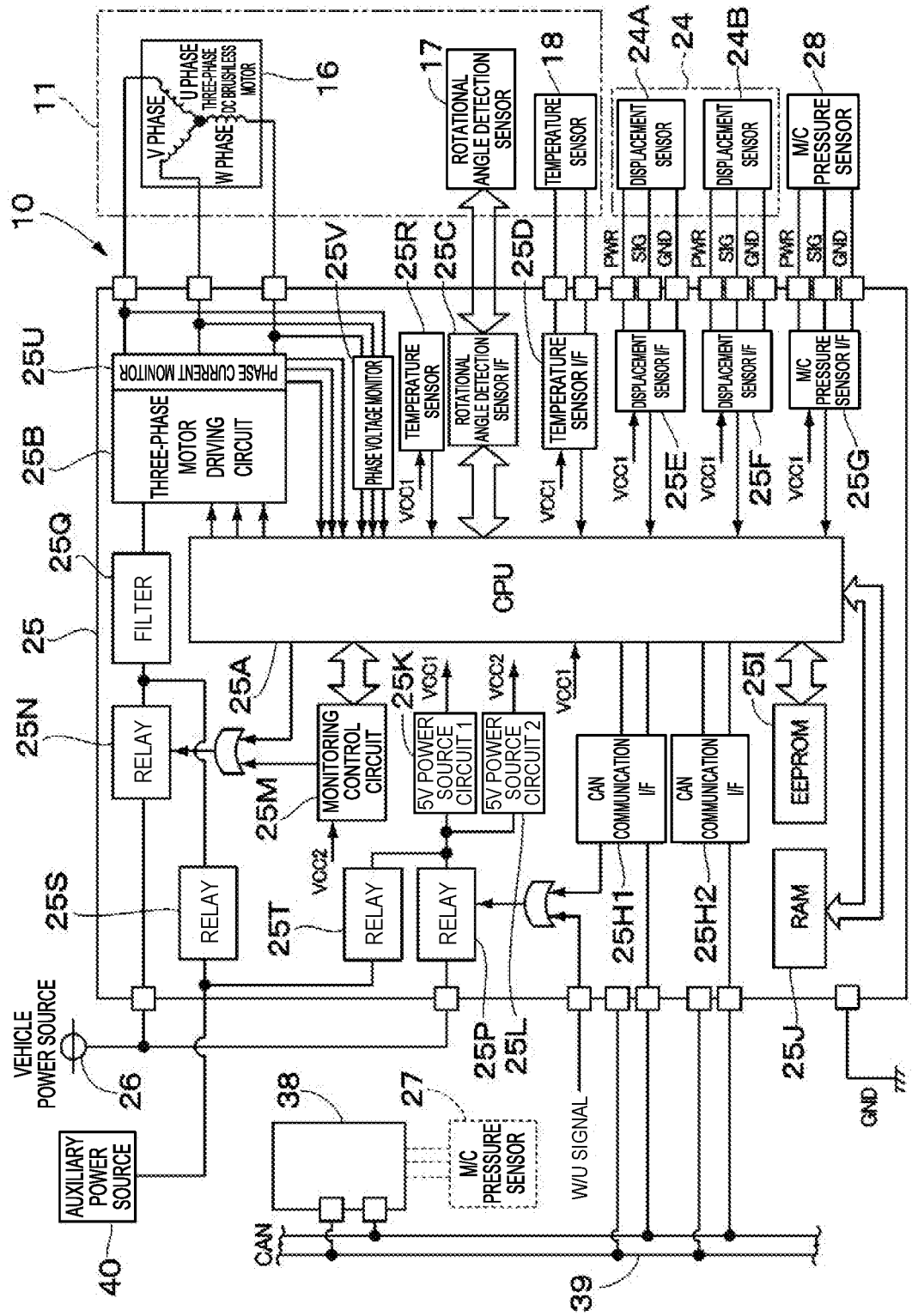
FIG. 2 is a circuit block diagram showing a circuit configuration of a master pressure control device and of a master pressure control mechanism.

The brake operation amount detection device 24 may be so configured that electric power supply and input signal processing for at least one of the sensors are performed by the wheel pressure control device 38 and that electric power supply and signal input processing for the other sensors are performed by the master pressure control device 25. If the brake operation amount detection device 24 is thus configured, in the event that either the master pressure control device 25 or the wheel pressure control device 38 fails in a CPU or in a power source, the braking demand of the operator still can be detected and recognized by the other sensors and control device. In this aspect, too, the failsafe can be ensured. Although FIG. 1 merely shows the brake operation amount detection device 24 as a single device, the brake operation amount detection device 24 may comprise two brake operation amount detection device 24 that are respectively connected to the master pressure control device 25 and the wheel pressure control device 38. According to the embodiments, as illustrated in FIG. 2 mentioned later, the brake operation amount detection device 24 comprises two displacement sensors 24A and 24B. The two displacement sensors 24A and 24B are connected to the master pressure control device 25.

Control on the master pressure control mechanism 11 by the master pressure control device 25 will be described below.

The master pressure control device 25 controls the electric motor 16 on the basis of a brake operation amount that is a detected value obtained by the brake operation amount detection device 24. To be specific, the master pressure control device 25 controls the driving of the electric motor 16 in accordance with the amount of operation of the input member 13 by the brake pedal 9. The master pressure control device 25 is actuated by electric power supplied from the vehicle power source 26 that is a main battery for driving vehicle lights, audio devices and the like installed in a vehicle. The vehicle power source 26 here refers to a vehicle battery and a vehicle power generator (alternator). If the vehicle is a conventional automobile (for example, an automobile equipped with an engine as a drive source), the vehicle power generator and the battery are utilized as the vehicle power source 26 functioning as a power source device of the vehicle. If the vehicle is a hybrid or electric automobile, a DC/DC convertor that converts voltage from a high-voltage power source to a low-voltage power source, such as a 12V or 24V battery, and a low-voltage battery (battery for an auxiliary device) are utilized as the vehicle power source 26.

The master pressure control device 25 actuates the electric motor 16, controls a position of the primary piston 6A, and thus generates hydraulic pressure on the basis of the operation amount (displacement amount, pedal effort and the like) of the brake pedal 9, which is detected by the brake operation amount detection device 24. The hydraulic pressure acting on the input piston 12 is then fed back to the brake pedal 9 through the input member 13 as a reaction force. Boost ratio that is ratio between the operation amount of the brake pedal 9 and generated hydraulic pressure can be adjusted on the basis of pressure-receiving area ratio and relative displacement between the primary piston 6A and the input piston 12. At this time, force corresponding to the master pressure acts on the brake pedal 9 through the input member 13 to be transmitted to the operator as brake pedal's reaction force. This eliminates the necessity of another device for generating the brake pedal's reaction force. The brake system 1 is therefore reduced in size and weight and consequently improved in installability in the vehicle.

A constant boost ratio determined by the pressure-receiving area ratio between the input piston 12 and the primary piston 6A can be obtained, for example, if the primary piston 6A is designed to coincide with the displacement of the input piston 12 and be subjected to relative displacement control so that relative displacement between the input piston 12 and the primary piston 6A becomes zero. The boost ratio can be changed by multiplying the displacement of the input piston 12 by proportion gain to change the relative displacement between the input piston 12 and the primary piston 6A.

This makes it possible to implement so-called brake assist control that detects the necessity of emergency braking from the operation amount of the brake pedal 9, operation speed (change rate of the operation amount) of the brake pedal 9 and the like, and increases the boost ratio to quickly obtain a necessary control force (hydraulic pressure). It is also possible to implement regenerative cooperative control that adjusts the boost ratio to generate hydraulic pressure remaining after deducting hydraulic pressure corresponding to a regenerative braking amount during regenerative braking on the basis of a signal transmitted from a regenerative braking system, not shown, and thus enables a desired braking force to be obtained by combining the hydraulic pressure corresponding to the regenerative braking amount and the braking force generated by the hydraulic pressure. It is also possible to implement automatic brake control that actuates the electric motor 16 to move the primary piston 6A and thus generates a braking force, regardless of the operation amount of the brake pedal 9 (displacement amount of the input piston 12). In this connection, if the braking force is automatically adjusted on the basis of the vehicle state thus detected by the sensor devices of various kinds and applied in proper combination with different vehicle control, such as engine control and steering control, it is possible to implement vehicle operation control including vehicle follow-up control, lane departure avoidance control, obstacle avoidance control and the like through the master pressure control mechanism 11.

The following description explains amplification of thrust of the input member 13.

When the primary piston 6A is displaced in accordance with the amount of displacement of the input piston 12 using the input member 13 by the operator's brake operation, thrust of the primary piston 6A is provided in accordance with thrust of the input member 13, so that the primary fluid chamber 6B is pressurized in the form of amplifying the thrust of the input member 13. Amplification ratio (hereinafter, referred to as "boost ratio") of the thrust may be set to any value on the basis of the relative displacement between the input member 13 and the primary piston 6A, ratio of sectional area between the input piston 12 and the primary piston 6A, and the like.

Especially, when the primary piston 6A is displaced only by the same displacement amount as the input member 13 (when the relative displacement between the input member 13 and the primary piston 6A is zero), the boost ratio is uniquely defined as "(AI+AA)/AI", where "AI" is sectional area of the input piston 12, and "AA" is sectional area of the primary piston 6A. In other words, AI and AA are set on the basis of the necessary boost ratio, and the primary piston 6A is controlled so that the displacement amount of AI and AA becomes equal to the displacement amount of the input piston 12. This makes it possible to obtain a fixed boost ratio. The displacement amount of the primary piston 6A can be calculated on the basis of an output signal of the rotational position sensor 17.

The following description explains processing that is performed when a boost ratio varying function is carried out.

Boost ratio varying control processing is control processing that displaces the primary piston 6A only by an amount obtained by multiplying the displacement amount of the input piston 12 by proportion gain (K1). K1 is preferably 1 (one) in view of controllability. However, if a braking force larger than the amount of the operator's brake operation is needed in case of emergency braking or the like, K1 may be changed to a value larger than 1 for a temporary period of time. The spring forces of the springs 14A and 14B act on the relative displacement of the input piston 12 and the primary piston 6A to adjust a reaction force acting on the input piston 12. Even if the brake operation amount is not changed, the master pressure can be increased, as compared to normal times (when K1 equals 1), to thereby generate a larger brake force. Determination of emergency brake can be determined, for example, on the basis of whether a temporal change rate of a signal of the brake operation amount detection device 24 is higher than a predetermined value.

The above-mentioned boost ratio varying control processing increases or decreases the master pressure in accordance with the displacement amount of the input member 13 which follows the operator's braking demand and therefore generates a braking force desired by the operator. If K1 is set to a value smaller than 1, the hydraulic brake can be applied to regenerative cooperative brake control that reduces the pressure of the hydraulic brake only by a regenerative braking amount in a so-called hybrid car or an electric automobile.

The following description explains processing that is performed when automatic braking function is carried out.

Automatic brake control processing is processing that advances and retracts the primary piston 6A to adjust working pressure of the master cylinder 6 to demanded hydraulic pressure of an automatic brake (hereinafter, referred to as automatic braking demand hydraulic pressure). Methods of controlling the primary piston 6A which can be used in the automatic brake control processing include a method that extracts the displacement amount of the primary piston 6A which materializes the automatic braking demand hydraulic pressure (braking demand) on the basis of relation between the displacement amount of the primary piston 6A and the master pressure, which is previously obtained in the form of a table, and uses the extracted displacement amount as a target value, a method that feeds back the master pressure detected by master pressure sensors 27 and 28, and other like methods. Any of the foregoing methods may be used. The automatic braking demand hydraulic pressure can be received from an external unit (for example, an ECU for automatic brake control). The automatic braking demand hydraulic pressure may be applied to brake control that is implemented, for example, in vehicle follow-up control, lane departure avoidance control, obstacle avoidance control and the like.

The following description explains configuration and actuation of the wheel pressure control mechanism 31.

The wheel pressure control mechanism 31, together with the wheel pressure control device 38, forms a hydraulic pressure supply device 30 that is called ESC. The wheel pressure control mechanism 31 includes gate OUT valves 32A and 32B, gate IN valves 33A and 33B, IN valves 34A, 34B, 34C and 34D, OUT valves 35A, 35B, 35C and 35D, pumps 36A and 36B, an electric motor 37, and the master pressure sensor 27. The gate OUT valves 32A and 32B control the supply of hydraulic brake pressure pressurized in the master cylinder 6 to the hydraulic brake devices 2FL, 2RR, 2FR and 2RL. The gate IN valves 33A and 33B control the supply of the brake fluid pressurized in the master cylinder 6 to the pumps 36A and 36B.

The IN valves 34A, 34B, 34C and 34D control the supply of the brake fluid from the master cylinder 6 or the pumps 36A and 36B to the hydraulic brake devices 2FL, 2RR, 2FR and 2RL. The OUT valves 35A, 35B, 35C and 35D implement pressure reduction control on the hydraulic brake devices 2FL, 2RR, 2FR and 2RL. The pumps 36A and 36B increase the hydraulic brake pressure generated in the master cylinder 6. The electric motor 37 activates the pumps 36A and 36B. The master pressure sensor 27 detects the master pressure on the secondary pipe 7B side. A hydraulic control unit for antilock brake control, a hydraulic control unit for vehicle behavior stabilization control or the like may be used as the wheel pressure control mechanism 31.

The wheel pressure control mechanism 31 comprises two systems including a first brake system that is supplied with brake fluid from the primary fluid chamber 6B to control the braking force of the left front and right rear wheels, and a second brake system that is supplied with brake fluid from the secondary fluid chamber 6D to control the braking force of the right front and left rear wheels. If one of the brake systems fails, the foregoing configuration ensures the braking force corresponding to the two wheels at opposing corners using the other brake system in a normal state, to thereby stably maintain the behavior of the vehicle.

The gate OUT valves 32A and 32B are disposed between the master cylinder 6 on one side and the IN valves 34A, 34B, 34C and 34D on the other. The gate OUT valves 32A and 32B are opened when the brake fluid pressurized in the master cylinder 6 is supplied to the hydraulic brake devices 2FL, 2RR, 2FR and 2RL. The gate IN valves 33A and 33B are disposed between the master cylinder 6 on one side and the pumps 36A and 36B on the other. The gate IN valves 33A and 33B are opened when the brake fluid pressurized in the master cylinder 6 is increased in pressure by the bumps 36A and 36B and supplied to the hydraulic brake devices 2FL, 2RR, 2FR and 2RL.

The IN valves 34A, 34B, 34C and 34D are disposed upstream of the hydraulic brake devices 2FL, 2RR, 2FR and 2RL. The IN valves 34A, 34B, 34C and 34D are opened when the brake fluid pressurized in the master cylinder 6 or the pumps 36A and 36B is supplied to the hydraulic brake devices 2FL, 2RR, 2FR and 2RL. The OUT valves 35A, 35B, 35C and 35D are provided downstream of the hydraulic brake devices 2FL, 2RR, 2FR and 2RL and opened when the wheel pressure is decreased. The gate OUT valves 32A and 32B, the gate IN valves 33A and 33B, the IN valves 34A, 34B, 34C and 34D, and the OUT valves 35A, 35B, 35C and 35D are electromagnetic valves that are opened/closed by energization of solenoids (not shown), and are independently adjustable in valve opening/closing amount through current control that is implemented by the wheel pressure control device 38.

The gate OUT valves 32A and 32B and the IN valves 34A, 34B, 34C and 34D are normally-open valves, whereas the gate IN valves 33A and 33B and the OUT valves 35A, 35B, 35C and 35D are normally-closed valves. Because of the foregoing configuration, if the electric power supply to the valves is disconnected in case of failure, the gate IN valves 33A and 33B and the OUT valves 35A, 35B, 35C and 35D are closed, and the gate OUT valves 32A and 32B and the IN valves 34A, 34B, 34C and 34D are opened, allowing the brake fluid pressurized in the master cylinder 6 to reach all the hydraulic brake devices 2FL, 2RR, 2FR and 2RL. Even in case of failure, therefore, the braking force demanded by the operator can be generated.

When there is a need for pressure higher than the working pressure of the master pressure 6, for example, in order to implement vehicle behavior stabilization control, automatic brake control or the like, the pumps 36A and 36B increase and supply the master pressure to the hydraulic brake devices 2FL, 2RR, 2FR and 2RL. Plunger pumps, trochoid pumps, gear pumps or other like pumps are usable as the pumps 36A and 36B. In view of silentness, gear pumps are desirable.

The electric motor 37 is operated by electric power that is supplied on the basis of a control command of the wheel pressure control device 38, to thereby drive the pumps 36A and 36B coupled to the electric motor 37. A DC motor, a DC brushless motor, an AC motor or another like motor is usable as the electric motor 37. In view of silentness, a DC motor is desirable.

The master pressure sensor 27 is disposed downstream of the secondary pipe 7B that is a master pipe on the secondary side. The master pressure sensor 27 is a pressure sensor (hydraulic sensor) that detects the master pressure and is connected to the wheel pressure control device 38. The master pressure sensor 27 is built in the wheel pressure control mechanism 31. The master pressure sensor 27 may be freely decided in number and installing position with consideration of controllability, failsafe and the like. The embodiments include the two master pressure sensors 27 and 28. More specifically, the embodiments include the second master pressure sensor 28 that detects the master pressure on the primary side in addition to the first master pressure sensor 27 that detects the master pressure on the secondary side. The second master pressure sensor 28 is disposed upstream of the primary pipe 7A that is a master pipe on the primary side. The second master pressure sensor 28 is connected to the master pressure control device 25.

The wheel pressure control mechanism 31 is controlled in operation by the wheel pressure control device 38. The wheel pressure control device 38 is operated by electric power that is supplied from the vehicle power source 26, calculates a target braking force to be generated in the wheels (FL, RR, FR, RL) on the basis of a vehicle state amount, and controls the wheel pressure control mechanism 31 on the basis of a calculated value. The wheel pressure control mechanism 31 receives the brake fluid pressurized by the master cylinder 6 in accordance with output of the wheel pressure control device 38 and controls the hydraulic brake pressure (wheel pressure) supplied to the hydraulic brake devices 2FL, 2RR, 2FR and 2RL of the wheels (FL, RR, FR, RL) to implement various brake controls.

In the foregoing case, the wheel pressure control device 38 controls the operation of the wheel pressure control mechanism 31, to thereby implement, for example, the following controls (1) to (8) and the like. (1) Braking force distribution control that properly distributes the braking force to the wheels (FL, RR, FR, RL) in accordance with earthing load or the like when the vehicle is braked. (2) Antilock brake control that automatically adjusts the braking force of the wheels (FL, RR, FR, RL) when the brake is applied, and thus prevents the wheels (FL, RR, FR, RL) from being locked (slipping). (3) Vehicle stabilization control that detects skidding of the wheels (FL, RR, FR, RL) with the vehicle running and properly automatically controls the braking force provided to the wheels (FL, RR, FR, RL) to repress understeer and oversteer and thus stabilize the behavior of the vehicle. (4) Hill start aid (HAS) control that maintains a braked state on a hill (especially an uphill) to aid the start of the vehicle. (5) Traction control that prevents the wheels (FL, RR, FR, RL) from spinning when the vehicle starts or in another like situation. (6) Vehicle follow-up control that keeps a certain distance from a preceding vehicle. (7) Lane departure avoidance control that keeps the vehicle in a driving lane. (8) Obstacle avoidance control (automatic brake control, advanced emergency braking control) that avoids collision with an object in front of or behind the vehicle.

When the master pressure control device 25 fails, the wheel pressure control mechanism 31 detects the amount of the brake operation by the operator from the hydraulic brake pressure detected by the first master pressure sensor 27. The wheel pressure control mechanism 31 then controls the pumps 36A and 36B and the like so as to generate wheel pressure corresponding to a detected value of the brake operation amount. This makes it possible to maintain the braking function of the brake system 1 even if the master pressure control device 25 fails.

The master pressure control device 25 and the wheel pressure control device 38 communicate with each other and share the control command and the vehicle state amount. The vehicle state amount is a value or data indicating, for example, yaw rate, longitudinal acceleration, lateral acceleration, steering angle, wheel speed, vehicle body speed, failure information, actuation state, and the like. The master pressure control device 25 and the wheel pressure control device 38 are therefore connected together through a vehicle data bus 39. The vehicle data bus 39 is a vehicle inter-ECU communication network (inter-device communication network) that is called CAN installed in the vehicle. In other words, the vehicle data bus 39 is a serial communication portion that performs multi-channel communication between a number of electronic devices (for example, between the master pressure control device 25 and the wheel pressure control device 38) installed in the vehicle.

An auxiliary power source 40 is charged with electric power and capable of supplying the electric power to the master pressure control device 25 if the vehicle power source 26 fails. Used as the auxiliary power source 40 is a capacitor such as an electric double layer capacitor in view of reliability. A small battery or a vehicle power source of another system may be utilized as the auxiliary power source 40. In any case, the auxiliary power source 40 is basically lower in suppliable amount of electric power than the vehicle power source 26 that is a main power source for supplying electric power to the master pressure control device 25.

The following description explains an example of a configuration of an electronic control circuit of the master pressure control device 25 with reference to FIG. 2.

Referring to FIG. 2, the master pressure control device 25 includes a CPU 25A, a three-phase motor drive circuit 25B, a rotational angle detection sensor interface 25C, a temperature sensor interface 25D, a first displacement sensor interface 25E, a second displacement sensor interface 25F, and the master cylinder pressure sensor interface 25G. The CPU 25A is a central computing device that is also called a central processing unit. The three-phase motor drive circuit 25B outputs drive current to the electric motor 16 functioning as a three-phase DC brushless motor in accordance with a command issued form the CPU 25A. The rotational angle detection sensor interface 25C is a connection circuit (connecting circuit) for allowing the CPU 25A to receive a detection signal transmitted from the rotational position sensor 17 functioning as a rotational angle detection sensor. The temperature sensor interface 25D is a connection circuit for allowing the CPU 25A to receive a detection signal transmitted from the temperature sensor 18. The first displacement sensor interface 25E and the second displacement sensor interface 25F are connection circuits for allowing the CPU 25A to receive detection signals transmitted from the brake operation amount detection device 24 (displacement sensors 24A and 24B) functioning as a brake operation sensor. The master cylinder pressure sensor interface 25G is a connection circuit for allowing the CPU 25A to receive a detection signal transmitted from the second master pressure sensor 28.

The master pressure control device 25 includes CAN communication interfaces 25H1 and 25H2, an EEPROM 25I, a RAM 25J, a first power source circuit 25K, a second power source circuit 25L, a monitoring control circuit 25M, a failsafe relay circuit 25N, an ECU power source relay circuit 25P, and a filter circuit 25Q. The CAN communication interfaces 25H1 and 25H2 are connection circuits for allowing the CPU 25A to receive CAN signals transmitted from various vehicle devices (ECU) including the wheel pressure control device 38. The EEPROM 25I is a memory that stores various pieces of information for the CPU 25A to perform the processing. The EEPROM 25I stores, for example, a processing program for performing a processing flow illustrated in FIG. 3 mentioned later (processing program used for control processing of current limitation according to voltage of the vehicle power source 26). The RAM 25J is a rewritable memory used for temporary storage of programs and data.

The first power source circuit 25K and the second power source circuit 25L supply stable electric power to various circuits of the master pressure control device 25 which includes the CPU 25A. The monitoring control circuit 25M monitors malfunction of the CPU 25A, the first power source circuit 25K, and the second power source circuit 25L. The failsafe relay circuit 25N switches connection and disconnection between the vehicle power source 26 and the three-phase motor drive circuit 25B. The ECU power source relay circuit 25P switches connection and disconnection between the vehicle power source 26 on one side and the first power source circuit 25K and the second power source circuit 25L on the other. The filter circuit 25Q removes electric power noise from the vehicle power source 26 (auxiliary power source 40 as necessary).

The master pressure control device 25 includes a temperature sensor 25R, a first relay circuit 25S for an auxiliary power source, and a second relay circuit 25T for an auxiliary power source. The temperature sensor 25R detects temperature of the mater pressure control device 25 (or more specifically, temperature of the three-phase motor drive circuit 25B) and outputs a signal corresponding to the temperature to the CPU 25A. The first relay circuit 25S for an auxiliary power source switches connection and disconnection between the auxiliary power source 40 and the three-phase motor drive circuit 25B. The second relay circuit 25T for an auxiliary power source switches connection and disconnection between the auxiliary power source 40 on one side and the first power source circuit 25K and the second power source circuit 25L on the other.

Inputted into the CPU 25A are various detection signals transmitted from the rotational position sensor 17, the temperature sensors 18 and 25R, the brake operation amount detection device 24 (displacement sensors 24A and 24B), the second master pressure sensor 28 and the like, various pieces of information transmitted through the CAN signals from the various vehicle devices and the like including the wheel pressure control device 38, and information stored in the EEPROM 25I and the RAM 25J, and the like. On the basis of the above-mentioned information (namely control signals form external devices, present detected values of the sensors, and the like), the CPU 25A outputs a proper command signal to the three-phase motor drive circuit 25B, to thereby control the electric motor 16 of the master pressure control mechanism 11. The three-phase motor drive circuit 25B is connected to the electric motor 16 at an output end thereof. When controlled by the CPU 25A, the three-phase motor drive circuit 25B converts DC power to AC power and drives the electric motor 16.

A phase current monitor circuit 25U and a phase voltage monitor circuit 25V are provided to each phase of three-phase output of the three-phase motor drive circuit 25B. The three-phase motor drive circuit 25B is monitored for phase current and phase voltage by the phase current monitor circuit 25U and the phase voltage monitor circuit 25V, respectively. On the basis of monitored values, the CPU 25A controls the three-phase motor drive circuit 25B to make the electric motor 16 operate properly. The CPU 25A diagnoses that there is a failure, in a case where a monitor value of the phase voltage monitor circuit 25V falls outside a normal range, where control is not implemented in accordance with the control command or in another like case.

When diagnosing that there is a failure, the CPU 25A outputs a failure signal to the monitoring control circuit 25M. On the basis of the failure signal outputted from the CPU 25A, the monitoring control circuit 25M actuates the failsafe relay circuit 25N and thus disconnects the electric power supply to the three-phase motor drive circuit 25B. In other words, the failsafe relay circuit 25N is capable of disconnecting the electric power supplied from the vehicle power source 26 to the three-phase motor drive circuit 25B and capable of controlling the supply and disconnection of electric power to and from the three-phase motor drive circuit 25B.

The first power source circuit 25K and the second power source circuit 25L are supplied with electric power from the vehicle power source 26 (auxiliary power source 40 as necessary) through the ECU power source relay circuit 25P. When receiving a CAN signal through the CAN communication interface 25H1 or receiving a predetermined start signal (W/U signal) through an ignition switch, a brake switch, a door switch (none of them shown), or the like, the ECU power source relay circuit 25P supplies electric power to the first power source circuit 25K and the second power source circuit 25L. The electric power of the vehicle power source 26 (auxiliary power source 40 as necessary) is supplied through the filter circuit 25Q to the three-phase motor drive circuit 25B. At this time, the filter circuit 25Q removes the noise of the electric power supplied to the three-phase motor drive circuit 25B.

The master pressure control device 25 thus configured actuates the electric motor 16 to control the position of the primary piston 6A on the basis of the displacement amount of the brake pedal 9, which is detected by the brake operation amount detection device 24 (displacement sensors 24A and 24B), to thereby generate hydraulic brake pressure. In other words, the master pressure control device 25 supplies current through the three-phase motor drive circuit 25B to the electric motor 16 in accordance with the amount of displacement (amount of motion) of the input member 13, which is caused by the brake pedal 9. After the current is supplied from the master pressure control device 25 to the electric motor 16, the output shaft 16A of the electric motor 16 is rotationally driven.

Rotation of the output shaft 16A is reduced by the belt reduction mechanism 23 and converted to a linear displacement (displacement in the right-left direction on FIG. 1) of the screw shaft 19A by the ball screw mechanism 19. The screw shaft 19A is displaced, for example, to the left on FIG. 1, integrally with the movable member 20 and the primary piston 6A. During the displacement, the primary piston 6A is advanced into the master cylinder 6 integrally with (or with a relative displacement to) the input piston 12. This generates hydraulic brake pressure according to the pedal effort (thrust) provided from the brake pedal 9 through the input member 13 to the input piston 12 and the thrust provided from the electric motor 16 to the primary piston 6A within the primary fluid chamber 6B and the secondary fluid chamber 6D of the master cylinder 6.

As described, the electric booster 10 comprising the master pressure control mechanism 11 and the master pressure control device 25 moves the primary piston 6A of the master cylinder 6 functioning also as a piston of the master pressure control mechanism 11. By moving the primary piston 6A, the electric booster 10 generates hydraulic brake pressure in the master cylinder 6 and supplies the hydraulic brake pressure to a hydraulic channel (primary pipe 7A and secondary pipe 7B).

Consideration will be made below as to a situation where the vehicle power source 26 that supplies electric power to the electric booster 10 is deteriorated. For example, the vehicle power source 26 for a hybrid or electric automobile comprises a DC/DC convertor that converts voltage from a high-voltage power source for supplying electric power to an electric motor for moving the vehicle to a low-voltage power source, and a low-voltage battery (battery for a vehicle's auxiliary device). Deterioration of the vehicle power source 26 configured as mentioned is likely to destabilize the electric power supplied from the vehicle power source 26 to the electric booster 10. For example, the battery for an auxiliary device is deteriorated, source voltage might be fluctuated.

When this happens, for example, the braking force is lessened as a result of decrease of the source voltage and of the output of the electric motor 16. Thereafter, the source voltage is restored to normal voltage, which is followed by restoration of the output of the electric motor 16. The braking force is then also restored to a normal state. At this point of time, if the brake pedal 9 is being pressed, that is, if the source voltage fluctuation generates with the brake pedal 9 pressed, the braking force is fluctuated, regardless of the operator's (driver's) intention. The operator then might have uncomfortable brake feeling. One idea for repressing the fluctuation of the braking force and reducing the uncomfortable feeling given to the operator is to keep the braking force from being restored to the normal state when the source voltage is restored to the normal voltage while the brake pedal 9 is pressed.

In such a case, however, there is a possibility that the operator feels a shortage of the braking force as the braking force-reduced state continues. To prevent this, it is necessary to provide measures for restoring the braking force without giving the uncomfortable feeling to the operator in the situation where after the decrease of the source voltage and the reduction of the braking force, when the source voltage is restored to the normal voltage while the brake pedal 9 is pressed. Meanwhile, it is possible to reduce an impact on the vehicle power source 26 by limiting the current supplied from the vehicle power source 26 to the electric motor 16 when the source voltage is reduced. Again, it is necessary to provide measures for restoring the braking force without giving the uncomfortable feeling to the operator in the situation where after the braking force is reduced as a result of the current limitation, when the source voltage is restored to the normal voltage while the brake pedal 9 is pressed. When the reduction of the source voltage is attributable to malfunction of the vehicle power source 26, if a large amount of electric power is consumed at the timing when the source voltage is restored, there is a possibility that the source voltage is decreased again. It is therefore preferable that the braking force be restored without applying the impact onto the vehicle power source 26.

According the embodiments, after the decrease of the source voltage and the reduction of the braking force, when the source voltage is restored to the normal voltage while the brake pedal 9 is pressed, the master pressure control device 25 restores the braking force while the current supplied from the vehicle power source 26 to the electric motor 16 is limited (transitional limitation). The current limited at this point of time is made lower than the current supplied from the vehicle power source 26 to the electric motor 16 when the vehicle power source 26 is normal and yet higher than the current supplied from the vehicle power source 26 to the electric motor 16 when the source voltage is decreased. According to the embodiments, as described, when the source voltage is restored with the brake pedal 9 pressed, the braking force is restored while the current supplied from the vehicle power source 26 to the electric motor 16 is limited (transitional limitation). This represses an abrupt fluctuation of the braking force while securing a predetermined braking force and therefore eliminates the uncomfortable brake feeling given to the operator. The impact on the vehicle power source 26 at the time of restoration of the source voltage is also reduced.

According to the embodiments, the master pressure control device 25 limits the current of the electric motor 16 on the basis of the voltage state of the vehicle power source 26. In this case, the voltage state of the vehicle power source 26 is determined by monitoring the voltage of an electric power supply line (source line) extending from the vehicle power source 26 to the inside of the master pressure control device 25. To that end, for example, a voltage sensor that detects the voltage of the vehicle power source 26 is disposed inside the master pressure control device 25. The voltage sensor may be disposed, for example, inside the master pressure control device 25 and in the electric power supply line between the vehicle power source 26 and the failsafe relay circuit 25N. The voltage sensor also may be disposed, for example, inside the master pressure control device 25 and in the electric power supply line between the vehicle power source 26 and the ECU power source relay circuit 25P. The voltage sensor may be disposed outside the master pressure control device 25, that is, in the electric power supply line between the master pressure control device 25 and the vehicle power source 26. It is also possible to obtain voltage information of the vehicle power source 26 through the vehicle data bus 39.

When the voltage of the vehicle power source 26 is decreased lower than a first predetermined voltage value (for example, a threshold value 1 in FIG. 4), the master pressure control device 25 determines that the voltage state of the vehicle power source 26 as "low voltage." When the voltage of the vehicle power source 26 is increased to be equal to or higher than a second predetermined voltage value (for example, a threshold value 2 in FIG. 4), the master pressure control device 25 determines that the voltage state of the vehicle power source 26 as "normal." The first predetermined voltage value and the second predetermined voltage value are preferably provided with such a hysteresis that relation expressed by "first predetermined voltage value<second predetermined voltage value" is established. This represses a possibility that the voltage of the vehicle power source 26 is determined as "normal" or "low voltage" every time the voltage of the vehicle power source 26 is slightly fluctuated. The first predetermined voltage value and the second predetermined voltage value are obtained by calculation, experiment, simulation or the like, for example, as values that enable accurate determination as to whether the voltage of the vehicle power source 26 is "normal" or "low voltage," and the obtained values are then previously stored (set) in the master pressure control device 25. In this case, the "first predetermined voltage value" may be set, for example, as such a value that the electric power supply to the electric booster 10 might become unstable. The "second predetermined voltage value" may be set, for example, as such a value that the electric power supply to the electric booster 10 becomes stable. The "low voltage" corresponds, for example, to voltage at which the output of the electric motor 16 is reduced, and the braking force is reduced, or voltage at which the current supplied to the electric motor 16 is limited to reduce an impact on the vehicle power source 26. The "normal" corresponds to voltage that is restored from the foregoing voltage states. The first and second predetermined voltage values may be the same value.

The master pressure control device 25 switches a current limit state of the current supplied to the electric motor 16 on the basis of a voltage state of the vehicle power source 26 and a state of the brake pedal 9. In this case, the master pressure control device 25 determines the state of the brake pedal 9 on the basis of a detected signal of the brake operation amount detection device 24. In this connection, for example, there is a possibility that the operator has uncomfortable feeling due to a change of the braking force while the automatic braking function is carried out. When the automatic braking function is carried out (when braking demand is made), therefore, it may be determined that the brake pedal 9 is pressed even if the brake pedal 9 is not pressed.

A determination as to whether the automatic braking function is carried out is made as below. For example, if at least any one of the following (A) to (D) is true, it is determined that the automatic braking function is carried out. (A) A case where the master pressure control device 25 receives an automatic braking demand from an external unit. (B) A case where the master pressure control device 25 controls a signal that is outputted from the CPU 25A to the three-phase motor drive circuit 25B in order to output the braking force generated by the automatic brake. (C) A case where the master pressure is detected by the master pressure sensor 28, and it is determined that the master pressure control mechanism 11 generates hydraulic pressure. (D) A case where the master pressure control device 25 receives from the wheel pressure control device 38 information that the wheel pressure control mechanism 31 is controlled by the wheel pressure control device 38.

The master pressure control device 25 then switches the current limit state to three states including a normal state (S4 in FIG. 3), a limit state A (S2 in FIG. 3) that is a main limit state, and a limit state B (S6 in FIG. 3) that is a transitional limit state. In the normal state, the master pressure control device 25 sets an upper limit of the current supplied to the electric motor 16 to a current limit value N (see FIG. 4). In the limit state A, the master pressure control device 25 sets the upper limit of the current supplied to the electric motor 16 to a current limit value A (see FIG. 4). In the limit state B, the master pressure control device 25 sets the upper limit of the current supplied to the electric motor 16 to a current limit value B (see FIG. 4).

The current limit value N is previously obtained by calculation, experiment, simulation or the like, for example, as a current upper limit value that enables desired operation to be performed by the electric booster 10 when the source voltage is normal. The current limit value A is previously obtained by calculation, experiment, simulation or the like, for example, as such a current upper limit value that current is provided in accordance with voltage when the source voltage is low. The current limit value B is previously obtained by calculation, experiment, simulation or the like, for example, as such a current upper limit value that the operator does not have uncomfortable feeling due to a shortage of the braking force when the source voltage is restored from low voltage to normal and does not have uncomfortable feeling due to an increase of the braking force. The current limit value N, the current limit value A, and the current limit value B are previously stored (set) in the master pressure control device 25.

The master pressure control device 25 makes the current supplied to the electric motor 16 lower than the current limit values (current limit value N, current limit value A, and current limit value B) in accordance with the current limit states (normal state, limit state A, and limit state B). When doing this, the master pressure control device 25 monitors the DC current supplied from the vehicle power source 26 through the failsafe relay circuit 25N to the three-phase motor drive circuit 25B and controls the signal outputted from the CPU 25A to the three-phase motor drive circuit 25B so that the DC current is lower than the current limit values N, A and B at this point of time. When the voltage of the vehicle power source 26 is drastically decreased, and there is the necessity of disconnecting the current supplied from the vehicle power source 26 to the electric motor 16, the current supplied from the vehicle power source 26 to the three-phase motor drive circuit 25B and the electric motor 16 may be disconnected by blocking the failsafe relay circuit 25N (for example, the current limit value A may be set to zero).

The following description explains, with reference to FIG. 3, control processing performed in the master pressure control device 25, that is, a processing flow of control of the current limitation according to the voltage of the vehicle power source 26. The control processing shown in FIG. 3 is repeatedly performed in a predetermined control cycle, for example, while the master pressure control device 25 is being energized.

After the control processing shown in FIG. 3 starts (after a processing routine is activated), the master pressure control device 25 makes a determination at S1 as to whether the voltage of the vehicle power source 26 is normal. For example, if the present current limit state is the "normal state" and also is the "current limit value B," the master pressure control device 25 determines whether the voltage of the vehicle power source 26 is equal to or higher than the first predetermined voltage value (threshold value 1 in FIG. 4). If the present current limit state uses the "current limit value A," the master pressure control device 25 determines whether the voltage of the vehicle power source 26 is equal to or higher than the second predetermined voltage value (threshold value 2 in FIG. 4).

If the determination at S1 is "NO," that is, if S1 determines that the voltage of the vehicle power source 26 is not normal (low voltage), the flow proceeds to S2. At S2, the present current limit state is set to a current at the "current limit value A." In other words, the current supplied to the electric motor 16 is set to be lower than the current limit value A. After the present current limit state is set to the "current limit value A" at S2, the flow returns. To be specific, the flow proceeds to a return step to return to start and repeats S1 and subsequent processing. If the determination at S1 is "YES," that is, if S1 determines that the voltage of the vehicle power source 26 is normal, the flow proceeds to S3. S3 makes a determination as to whether the present current limit state is the "normal state."

If the determination at S3 is "YES," that is, if the present current limit state is determined as the "normal state," the flow proceeds to S4 and returns. At S4, the present current limit state is set to the "normal state." In other words, the current supplied to the electric motor 16 is set to be lower than the current limit value N. If the determination at S3 is "NO," that is, if S3 determines that the present current limit state is not the "normal state" (the present current limit state is the "limit state A" or the "limit state B"), the flow proceeds to S5. S5 makes a determination as to whether the brake pedal 9 is operated, that is, whether the brake pedal 9 is pressed. For example, when the automatic braking function is carried out, the brake pedal 9 may be determined to be pressed even if not pressed.

If the determination at S5 is "NO," that is, if S5 determines that the brake pedal 9 is not pressed, the flow proceeds to S4 and returns. At S4, the present current limit state is set to the "normal state" as described. If the determination at S5 is "YES," that is, if S5 determines that the brake pedal 9 is pressed, the flow proceeds to S6 and returns. At S6, the present current limit state is set to the "limit state B." In other words, the current supplied to the electric motor 16 is set to be lower than the current limit vale B.

Figure 4:
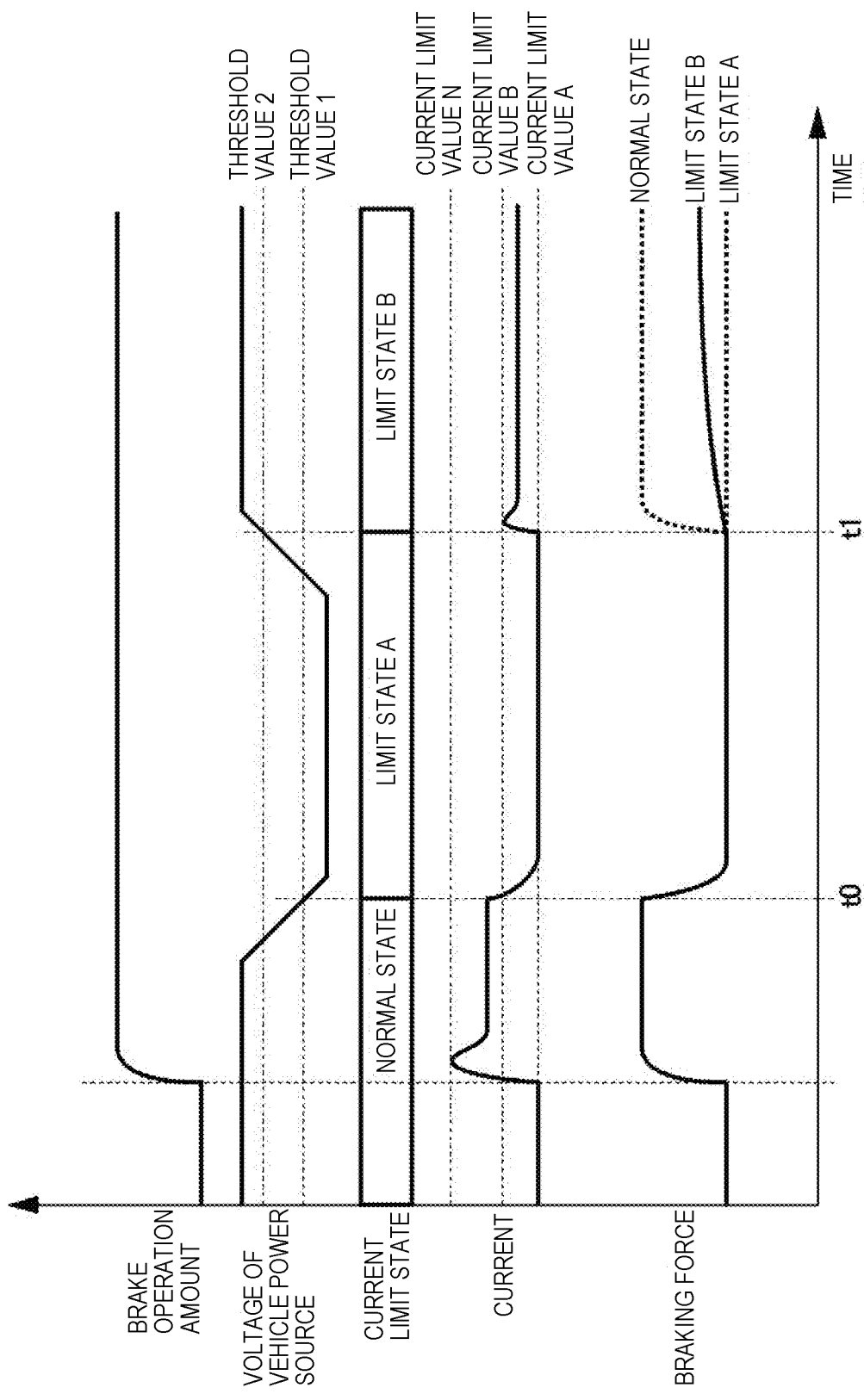
FIG. 4 is a characteristic line graph showing an example of temporal changes of a brake operation amount, voltage of a vehicle power source, a current limit state, current, and a control force according to the first embodiment.

The following description explains, with reference to FIG. 4 in addition to FIG. 3, switching of the limit state of the current supplied to the electric motor 16 when the voltage of the vehicle power source 26 is fluctuated.

If the voltage state of the vehicle power source 26 is normal before a time point t0 in FIG. 4, it is not necessary to limit the current supplied to the electric motor 16. In such a case, the determinations at S1 and S3 are "YES," that is, it is determined that the voltage state of the vehicle power source 26 is normal. The flow then proceeds to S4. The current limit state continues to be the normal state in which the current supplied to the electric motor 16 is lower than the current limit value N. During this period, the braking force generated at normal times can be outputted in accordance with the operator's brake operation amount. The current limit value N in the normal state may be decided on the basis of a maximum value of the braking force to be generated, a maximum rate of rise of the braking force, the current that can be outputted by the vehicle power source 26, and the like. The current limit value N is a current limit value larger than the current limit values A and B.

When the voltage of the vehicle power source 26 is decreased at the time point t0 in FIG. 4, the current supplied from the vehicle power source 26 to the electric motor 16 is limited to be lower than the current limit value N to reduce the impact on the vehicle power source 26. In such a case, the determination at S1 is "NO," that is, S1 determines that the voltage state of the vehicle power source 26 is low voltage. The flow then proceeds to S2, which brings the current limit state into the limit state A in which the current supplied to the electric motor 16 is limited to be lower than the current limit value A. At this time, the braking force relative to the operator's brake operation amount is reduced lower than in the normal state.

At a time point t1 in FIG. 4, the voltage of the vehicle power source 26 is restored to the normal state. The current limit state at the time point t1 is the limit state A. Therefore, in order to prevent the operator from feeling uncomfortable feeling, cancellation of the current limit state is determined, depending on whether the brake pedal 9 is pressed. In this case, the determination at S1 is "YES," that is, S1 determines that the voltage state of the vehicle power source 26 is normal, and the determination at S3 is "NO," that is, S3 determines that the current limit state is the "limit state A." The flow then proceeds to S5. S5 makes a determination as to whether the brake pedal 9 is pressed. If the determination at S5 is "YES," that is, if S5 determines that the brake pedal 9 is pressed, the flow proceeds to S6 to reduce a fluctuation amount of the braking force. In such a case, the current limit state becomes the limit state B in which the current supplied to the electric motor 16 is limited to be lower than the current limit value B. If the determination at S5 is "NO," that is, if S5 determines that the brake pedal 9 is not pressed, there is no fear that the operator receives uncomfortable feeling. The flow therefore proceeds to S4 to restore the braking force to the normal state. The current limit state becomes the normal state in which the current supplied to the electric motor 16 is limited to be lower than the current limit value N.

The current limit value B is set to be larger than the current limit value A and yet smaller than the current limit value N in the normal state. In order to improve brake feeling, each of the predetermined values of the current limit values N, A, and B may be set to a limit value that changes with time, instead of being limited to a fixed current value.

After the time point t1 in FIG. 4, if the current limit state is not the normal state while the voltage state of the vehicle power source 26 is normal, the cancellation of the current limit state is determined, depending on whether the brake pedal 9 is pressed, to prevent the operator from receiving uncomfortable feeling. In such a case, the determination at S1 is "YES," and the determination at S3 is "NO." More specifically, it is determined that the current limit state is the "limit state B." If the determination at S5 is "YES," that is, if S5 determines that the brake pedal 9 is pressed, the flow proceeds to S6, and the current limit state continues to be the limit state B. If the determination at S5 is "NO," that is, if S5 determines that the brake pedal 9 is not pressed, there is no fear that the operator receives uncomfortable feeling. The flow therefore proceeds to S4 to restore the braking force to the normal state, and the current limit state becomes the normal state.

According to the embodiments, as described, the mater pressure control device 25 limits the driving of the electric motor 16 in accordance with the operation amount (braking demand) of the input member 13 if the condition for limiting the driving of the electric motor 16 is satisfied due to the decrease of the voltage of the vehicle power source 26. In other words, the master pressure control device 25 drives the electric motor 16 in accordance with the braking demand, produces deceleration (braking force), and limits the current supplied to the electric motor 16 in response to the braking demand to be equal to or lower than a predetermined current value (lower than the current limit value A) if the condition for limiting the driving of the electric motor 16 is satisfied.

If the condition for limiting the driving of the electric motor 16 is cancelled due to restoration of the voltage of the vehicle power source 26 to normal while the brake pedal 9 is pressed, the current for driving the electric motor 16 in accordance with the operation amount of the input member 13 is made by the master pressure control device 25 to be higher than when the driving of the electric motor 16 is limited and yet lower than when the driving of the electric motor 16 is not limited. In other words, if the condition for limiting the driving of the electric motor 16 is cancelled during the operation of the brake pedal 9, the master pressure control device 25 makes the current supplied to the electric motor 16 in response to the braking demand higher than the predetermined current value (current limit value A) and yet lower than when the driving of the electric motor 16 is not limited (current limit value N).

According to the first embodiment, the condition for limiting the driving of the electric motor 16 is that the source voltage of the vehicle becomes lower than the first predetermined voltage value (threshold value 1 in FIG. 4). The condition for limiting the driving of the electric motor 16 is cancelled when the source voltage of the vehicle becomes equal to or higher than the second predetermined voltage value (threshold value 2 in FIG. 4). However, if the brake pedal 9 is operated when the condition for limiting the driving of the electric motor 16 is cancelled, the current for driving the electric motor 16 is set to the limit value (current limit value B) that is larger than the limit value before the cancellation (current limit value A) and smaller than the normal-time limit value (current limit value N).

The electric booster 10 and the master pressure control device 25 according to a first embodiment are configured as described above. Operation of the electric booster 10 and the master pressure control device 25 will be now discussed.

When the operator of the vehicle presses the brake pedal 9, the input member 13 of the electric booster 10, which is coupled to the brake pedal 9, is displaced integrally with the input piston 12 toward the master cylinder 6. Along with the displacement of the input member 13 and input piston 12, the electric motor 16 of the electric booster 10 is controlled in operation by the master pressure control device 25. In other words, the master pressure control device 25 supplies electric power to the electric motor 16 on the basis of the detected signal transmitted from the brake operation amount detection device 24 (24A and 24B) and thus rotationally drives the electric motor 16. Rotation of the electric motor 16 is transmitted through the belt reduction mechanism 23 to the nut member 19B of the ball screw mechanism 19. Rotation of the nut member 19B is converted into an axial displacement of the screw shaft 19A of the ball screw mechanism 19. The screw shaft 19A presses the primary piston 6A of the master cylinder 6 through the movable member 20 to the left on FIG. 2. The primary piston 6A is thus advanced (displaced to the left on FIG. 2) substantially integrally with the input member 13. This leads to generation of hydraulic brake pressure within the primary fluid chamber 6B and the secondary fluid chamber 6D of the master cylinder 6. This hydraulic brake pressure corresponds to brake effort (thrust) that is provided from the brake pedal 9 to the input member 13 and thrust that is provided from the electric motor 16 to the primary piston 6A.

When the voltage of the vehicle power source 26 is decreased as a result of deterioration of the vehicle power source 26 or the like, the master pressure control device 25 limits the driving of the electric motor 16. More specifically, when the voltage of the vehicle power source 26 deviates from the normal state and becomes lower than the first predetermined voltage value (threshold value 1 in FIG. 4), the master pressure control device 25 changes the upper limit value of the current for driving the electric motor 16 from the current limit value N to the current limit value A. While the brake pedal 9 is pressed, if the voltage of the vehicle power source 26 is restored to normal, that is, if the voltage of the vehicle power source 26 becomes equal to or higher than the second predetermined voltage value (threshold value 2 in FIG. 4), the master pressure control device 25 changes the upper limit value of the current for driving the electric motor 16 from the current limit value A to the current limit value B. The master pressure control device 25 changes the upper limit value of the current for driving the electric motor 16 from the current limit value A or the current limit value B to the current limit value N when the brake pedal 9 is not pressed. In such a case, the upper limit value of the current is "current limit value A<current limit value B<current limit value N."

According to the first embodiment, as described, the master pressure control device 25 does not completely cancel the limitation on the driving of the electric motor 16 if the voltage of the vehicle power source 26 is restored to normal with the brake pedal 9 pressed while the driving of the electric motor 16 is limited (main limitation) due to the decrease of voltage of the vehicle power source 26. In other words, even if the voltage of the vehicle power source 26 is restored to normal while the current of the electric motor 16 is limited (main limitation) to be equal to or lower than the predetermined current value (lower than the current limit value A), the master pressure control device 25 restores the braking force in the state where the current for driving the electric motor 16 is limited (transitional limitation) as long as the brake pedal 9 is pressed.

Figure 5:
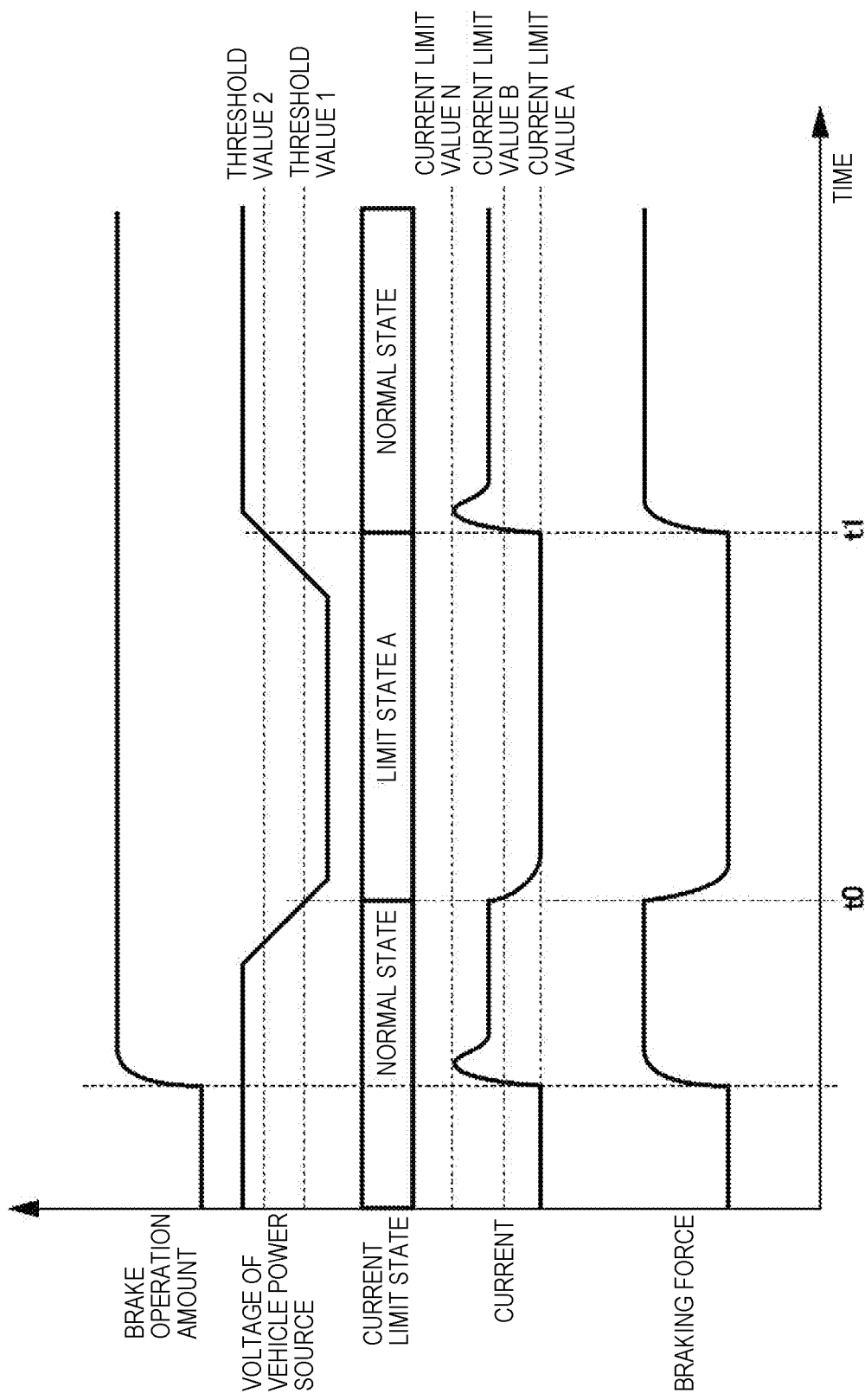
FIG. 5 is a characteristic line graph showing an example of temporal changes of a brake operation amount, voltage of a vehicle power source, a current limit state, current, and a control force according to a first comparative example.
Figure 6:
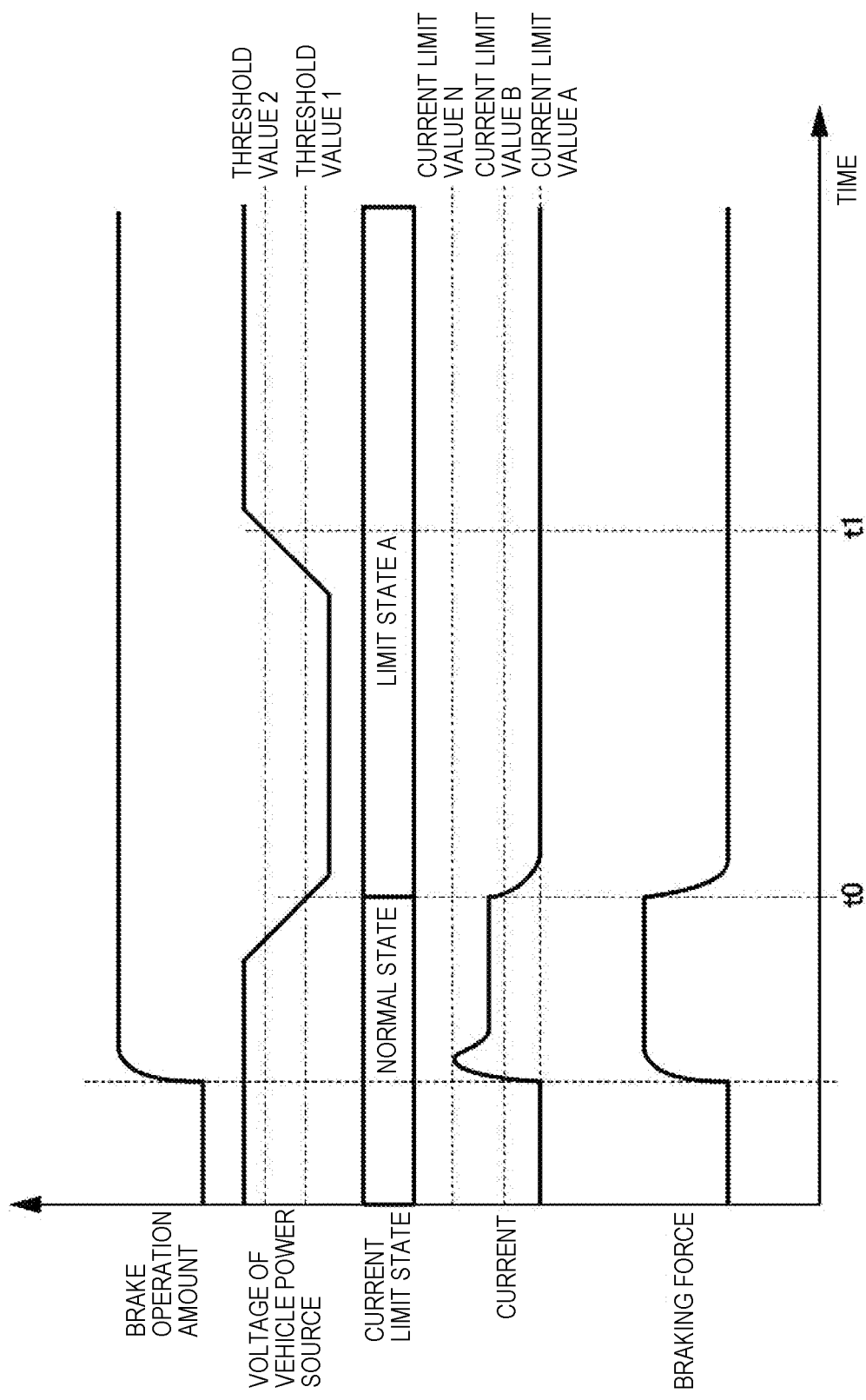
FIG. 6 is a characteristic line graph showing an example of temporal changes of a brake operation amount, voltage of a vehicle power source, a current limit state, current, and a control force according to a second comparative example.

FIG. 4 shows an example of temporal changes of the brake operation amount, the voltage of the vehicle power source, the current limit state, current, and the control force according to the first embodiment. FIG. 5 shows a first modification example, that is, an example of temporal changes in such a configuration that, when the voltage of the vehicle power source 26 is restored from low voltage to normal, the current limit state is shifted from the limit state A to the normal state even if the brake pedal 9 is operated. FIG. 6 shows a second modification example, that is, an example of temporal changes in such a configuration that, even if the voltage of the vehicle power source 26 is restored from low voltage to normal, the limit state A is continued while the brake pedal 9 is operated.

As illustrated in FIG. 5, according to the configuration in which the current limit state is shifted from the limit state A to the normal state at the time point t1, the braking force abruptly rises and returns to a large degree as in normal times, which might give uncomfortable feeling to the operator. According to the configuration illustrated in FIG. 6 in which the current limit state continues to be the limit state A after the time point t1, the state in which the braking force is decreased continues. Again, the operator might have uncomfortable feeling. According to the first embodiment, in contrast, the current limit state is shifted from the limit state A to the limit state B at the time point t1 as illustrated in FIG. 4. In such a case, the current limit value B is smaller than the current limit value N. In other words, the current during the transitional limitation at and after the time point t1 (current limit value B) is smaller than when the driving of the electric motor 16 is not limited.

The first embodiment therefore allows a rotational rate of the electric motor 16 and a rate of rise of the braking force to be reduced lower than the first modification example illustrated in FIG. 5. In addition, the degree of the braking force after the rise of the braking force can be reduced smaller than normal times. The first embodiment thus solves the abrupt fluctuation of the braking force and solves the operator's uncomfortable feeling. Furthermore, since the value of the current supplied from the vehicle power source 26 to the electric motor 16 is set to the current limit value B that is smaller than the current limit value N of the normal state, the impact on the vehicle power source 26 is reduced. For example, therefore, when the voltage is restored from a temporary decrease caused by malfunction of the vehicle power source 26, it is possible to decrease a possibility that the voltage of the vehicle power source 26 is decreased again.

The current limit value B is larger than the current limit value A. As compared to FIG. 6, therefore, a larger braking force is generated. Moreover, a shortage of the braking force is repressed by setting the current limit value B to a current value that is necessary for outputting the predetermined braking force. From this aspect, too, the operator's uncomfortable feeling is solved.

Figure 8:
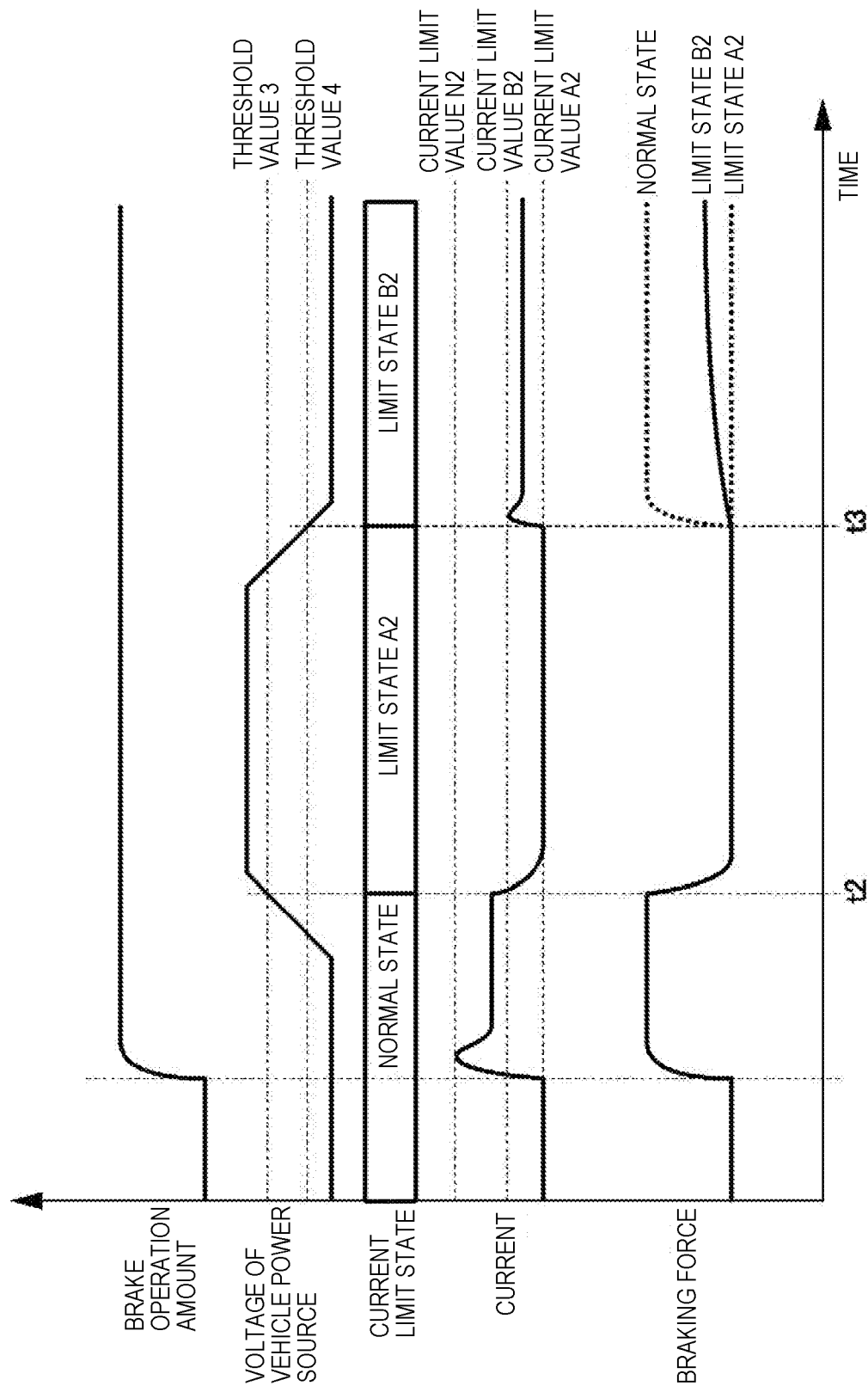
FIG. 8 is a characteristic line graph showing an example of temporal changes of a brake operation amount, voltage of a vehicle power source, a current limit state, current, and a control force according to the second embodiment.

FIGS. 7 and 8 show a second embodiment. The second embodiment is characterized in that, when the source voltage of the vehicle is increased higher than a third predetermined voltage value, the driving of the electric actuator is limited. Constituent elements of the second embodiment which are the same as those of the first embodiment will be provided with the respective same reference signs, and explanations thereof will be omitted.

The first embodiment is so configured that, after the current is limited (main limitation) due to the decrease of voltage of the vehicle power source 26, if the voltage is restored to a normal state while the brake pedal 9 is pressed, the current limitation (transitional limitation) is imposed. The first embodiment also may be so configured that, after the current is limited (main limitation) due to a different factor than the decrease of voltage of the vehicle power source 26, if the voltage is restored to the normal state while the brake pedal 9 is pressed, the current limitation (transitional limitation) is imposed. According to the second embodiment, after the current is limited (main limitation) for the reason that the voltage of the vehicle power source 26 is increased higher than normal times, if the voltage is restored to the normal state while the brake pedal 9 is pressed, the current limitation (transitional limitation) is imposed.

According to the second embodiment, more specifically, when the voltage of the vehicle power source 26 is increased higher than normal times, the current supplied to the electric motor 16 is limited (main limitation), taking into account heat generation and high voltage resistance characteristics of the three-phase motor drive circuit 25B and the like which is supplied with electric power from the vehicle power source 26. In such a case, the electric power supplied from the vehicle power source 26 to the three-phase motor drive circuit 25B and the electric motor 16 may be disconnected by blocking the failsafe relay circuit 25N. At this time, the braking force is decreased by limiting the current (main limitation). When the voltage is thereafter restored to normal, the same current limitation as the first embodiment is imposed, which restores the braking force without giving uncomfortable feeling to the operator.

A determination of a voltage state of the vehicle power source 26 is made by monitoring the voltage of an electric power supply line extending from the vehicle power source 26 into the master pressure control device 25. The master pressure control device 25 determines that the voltage state of the vehicle power source 26 is "high voltage" when the voltage of the vehicle power source 26 is increased to be equal to or higher than the third predetermined voltage value (threshold value 3 in FIG. 8, for example). The master pressure control device 25 determines that the voltage state of the vehicle power source 26 is "normal" when the voltage of the vehicle power source 26 is decreased lower than a fourth predetermined voltage value (threshold value 4 in FIG. 8, for example). The predetermined voltage value is, for example, "third predetermined voltage value>fourth predetermined voltage value." The third predetermined voltage value and the fourth predetermined voltage value may be set, for example, to such values that a proper determination can be made as to whether the voltage of the vehicle power source 26 is "normal" or "high voltage." In this case, the "third predetermined voltage value" may be set, for example, to such a value that voltage applied to the electric booster 10 is likely to be excessive. The "fourth predetermined voltage value" may be set, for example, to such a value that the voltage applied to the electric booster 10 becomes stable. The "high voltage" corresponds, for example, to voltage based on the heat generation and the high voltage resistance characteristics of the three-phase motor drive circuit 25 and the like which is supplied with electric power from the vehicle power source 26. The "normal" corresponds to voltage restored from the above-mentioned voltage state.

FIG. 7 shows a processing flow of current limitation control performed by the master pressure control device 25 according to the second embodiment. S3, S4 and S5 in FIG. 7 are the same processing as S3, S4 and S5 of the first embodiment. The following description therefore will explain S11, S12 and S13 in FIG. 7.

When the control processing shown in FIG. 7 starts, the master pressure control device 25 makes a determination at S11 as to whether the voltage of the vehicle power source 26 is normal. For example, if the present current limit state is the "normal state" or a "current limit value B2," the master pressure control device 25 makes a determination as to whether the voltage of the vehicle power source 26 is lower than the third predetermined voltage value (threshold value 3 in FIG. 8). If the present current limit state is a "current limit value A2," the master pressure control device 25 makes a determination as to whether the voltage of the vehicle power source 26 is lower than the fourth predetermined voltage value (threshold value 4 in FIG. 8).

If the determination at S11 is "NO," that is, if S11 determines that the voltage of the vehicle power source 26 is not normal (high voltage), the flow proceeds to S12 and returns. At S12, the present current limit state is set to the "current limit value A2." In other words, the current supplied to the electric motor 16 is set to be lower than the current limit value A2. If the determination at S5 is "YES," that is, if S5 determines that the brake pedal 9 is pressed, the flow proceeds to S13 and returns. At S13, the present current limit state is set to the "limit state B2." That is, the current supplied to the electric motor 16 is set to be lower than the current limit value B2.

FIG. 8 shows an example of temporal changes of the brake operation amount, the voltage of the vehicle power source, the current limit state, current, and control force according to the second embodiment. When it is determined that the voltage of the vehicle power source 26 is increased higher than normal times and becomes high voltage at the time point t2, the current limit state is brought into a limit state A2 in which the current supplied from the vehicle power source 26 to the electric motor 16 is lower than the current limit value A2 (S12). When the voltage is thereafter restored to normal, if the brake pedal 9 is pressed, the current limit state is brought into the limit state B2 in which the current is lower than the current limit value B2 (S13). If the brake pedal 9 is not pressed, the current limit state is brought into the normal state in which the current is set to a current limit value N2 (S4).

The current limit value B2 is larger than the current limit value A2 and smaller than the current limit value N2. The current limit value N2 may be, for example, the same value as the current limit value N of the first embodiment. The current limit value A2 may be set, for example, to a current upper limit value that can be provided in accordance with the source voltage when the source voltage is high voltage. The current limit value B2 may be set, for example, to such a current upper limit value that the operator does not have uncomfortable feeling due to a shortage of the braking force when the source voltage is restored from the high voltage to normal and does not have uncomfortable feeling due to an increase of the braking force.

According to the second embodiment, as described, a condition for limiting the driving of the electric motor 16 is that the source voltage of the vehicle becomes higher than the third predetermined voltage value (threshold value 3 in FIG. 8). The condition for limiting the driving of the electric motor 16 is cancelled when the source voltage of the vehicle becomes equal to or lower than the fourth predetermined voltage value (threshold value 4 in FIG. 8). However, if the brake pedal 9 is operated at the time of cancellation of the condition for limiting the driving of the electric motor 16, the current for driving the electric motor 16 is set to the limit value (current limit value B2) that is larger than the limit value before the cancellation (current limit value A2) and smaller than the normal-time limit value (current limit value N2).

The second embodiment imposes the above-described current limitation. There is no particular difference in basic operation between the current limitation of the second embodiment and that of the first embodiment. Especially, according to the second embodiment, after the current is limited (main limitation) for the reason that the voltage of the vehicle power source 26 is increased higher than normal, if the voltage of the vehicle power source 26 is restored to the normal state while the brake pedal 9 is pressed, the current limit state is shifted from the limit state A2 to the limit state B2 (transitional limitation). Consequently, the rate of rise of the braking force is reduced, and the degree of the braking force is made smaller than normal times, to thereby solve the abrupt fluctuation of the braking force. Furthermore, a shortage of the braking force is repressed by setting the current limit value B2 to the current value that is necessary for outputting the predetermined braking force. This reduces the operator's uncomfortable feeling.

Figure 10:
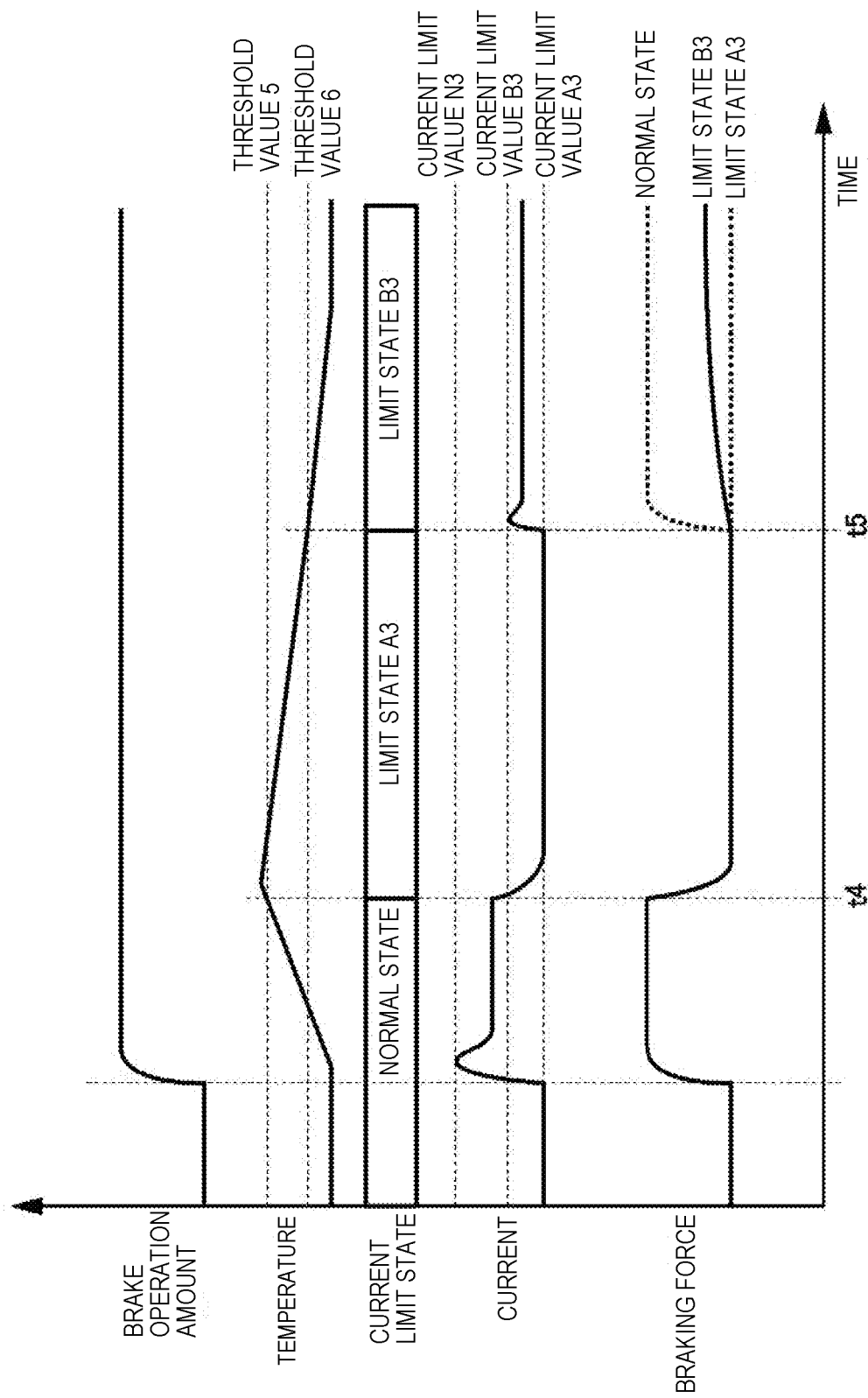
FIG. 10 is a characteristic line graph showing an example of temporal changes of a brake operation amount, temperature, a current limit state, current, and a control force according to the third embodiment.

FIGS. 9 and 10 show a third embodiment. The third embodiment is characterized in that, when temperature of the electric actuator becomes higher than a first predetermined temperature value or when temperature of the control device becomes higher than a second predetermined temperature value, the driving of the electric actuator is limited. Constituent elements of the third embodiment which are the same as those of the first embodiment will be provided with the respective same reference signs, and explanations thereof will be omitted.

According to the third embodiment, if the current is limited (main limitation) due to higher temperature of the electric motor 16 or of the master pressure control device 25 (three-phase motor drive circuit 25B) than normal times, and thereafter, the temperature is restored to the normal state with the brake pedal 9 pressed, current limitation (transitional limitation) is imposed. In other words, according to the third embodiment, when the temperature of the electric motor 16 or of the three-phase motor drive circuit 25B is increased higher than normal times, a heat generation amount in a motor coil of the electric motor 16 or in the three-phase motor drive circuit 25B is reduced by limiting the current supplied to the electric motor 16 is limited (main limitation) to avoid further increase of the temperature. In this case, the electric power supplied from the vehicle power source 26 to the three-phase motor drive circuit 25B and the electric motor 16 may be disconnected by blocking the failsafe relay circuit 25N. At this time, the current limitation (main limitation) reduces the braking force. The braking force is restored without giving uncomfortable feeling to the operator by imposing the same current limitation as the first embodiment when the temperature is later restored to normal.

A state of temperature of the electric motor 16 can be determined by monitoring a detected value (temperature) of the temperature sensor 18 (see FIG. 2) disposed in the electric motor 16 or using a temperature estimation value that is estimated on the basis of electric power supplied to the electric motor 16. A state of temperature of the three-phase motor drive circuit 25B can be determined by monitoring a detected value (temperature) of the temperature sensor 25R (see FIG. 2) of the master pressure control device 25 or using a temperature estimation value that is estimated on the basis of electric power supplied to the three-phase motor drive circuit 25B.

The master pressure control device 25 determines that the temperature state is "high temperature" when the temperature of the electric motor 16 is increased to be equal to or higher than a first predetermined temperature value (threshold 5 in FIG. 10, for example) or when the temperature of the three-phase motor drive circuit 25B is increased to be equal to or higher than a second predetermined temperature value (threshold value 5 in FIG. 10, for example). The master pressure control device 25 determines that the temperature state is "normal" when the temperature of the electric motor 16 is decreased lower than a fourth predetermined temperature value (threshold value 6 in FIG. 10, for example) or when the temperature of the three-phase motor drive circuit 25B is decreased lower than a fifth predetermined temperature value (threshold value 6 in FIG. 10, for example). The predetermined temperature values are, for example, "first predetermined temperature value>fourth predetermined temperature value," and "second predetermined temperature value>fifth predetermined temperature value." According to the third embodiment, the first and second predetermined temperature values are the same value (threshold value 5), and the fourth and fifth predetermined temperature values are the same value (threshold value 6). The first and second predetermined temperature values may be different values, and the fourth and fifth predetermined temperature values also may be different values. The first, second, fourth and fifth predetermined temperature values may be set, for example, to such values that whether the temperature of the vehicle power source 26 or of the three-phase motor drive circuit 25B is "normal" or "high temperature" can be accurately determined. In such a case, the "first predetermined temperature value" and the "second predetermined temperature value" may be set, for example, to such values that the temperature of the electric booster 10 (electric motor 16, master pressure control device 25) might become excessive. The "fourth predetermined temperature value" and the "fifth predetermined temperature value" may be set, for example, to such values that the temperature of the electric booster 10 (electric motor 16, master pressure control device 25) becomes stable. The "high temperature" corresponds, for example, to temperature for protecting the three-phase motor drive circuit 25B and the like supplied with electric power from the vehicle power source 26. The "normal" corresponds to temperature that is restored from the above-described temperature state.

FIG. 9 shows a processing flow of current limitation control that is implemented in the master pressure control device 25 according to the third embodiment. S3, S4 and S5 in FIG. 9 are the same processing as S3, S4 and S5 of the first embodiment. The following description therefore will explain processing that is performed in S21, S22 and S23 of FIG. 9.

With the beginning of the control processing shown in FIG. 9, the master pressure control device 25 makes a determination at S21 as to whether the temperature of the electric motor 16 or of the three-phase motor drive circuit 25B is normal. For example, if the present current limit state is the "normal state" and the "current limit value B3," the master pressure control device 25 makes a determination as to whether the temperature of the electric motor 16 or of the three-phase motor drive circuit 25B is lower than the threshold value 5 (FIG. 10). If the present current limit state is the "current limit value A3," the master pressure control device 25 makes a determination as to whether the temperature of the electric motor 16 or of the three-phase motor drive circuit 25B is lower than the threshold value 6 (FIG. 10).

If the determination at S21 is "NO," that is, if S21 determines that the temperature is not normal (high temperature), the flow proceeds to S22 and returns. At S22, the present current limit state is set to the "current limit value A3." More specifically, the current supplied to the electric motor 16 is set to be lower than the current limit value A3. If the determination at S5 is "YES," that is, if S5 determines that the brake pedal 9 is pressed, the flow proceeds to S23 and returns. At S23, the present current limit state is set to the "limit state B3." More specifically, the current supplied to the electric motor 16 is set to be lower than the current limit value B3.

FIG. 10 shows an example of temporal changes of the brake operation amount, temperature, the current limit state, current, and control force according to the third embodiment. At a time point t4, if the temperature of the electric motor 16 or of the three-phase motor drive circuit 25B is increased higher than normal times and is determined to be high temperature, the current limit state is shifted to the limit state A3 in which the current supplied from the vehicle power source 26 to the electric motor 16 is lower than the current limit value A3 (S22). If the temperature is later restored to normal with the brake pedal 9 pressed, the current limit state is shifted to the limit state B3 in which the current is lower than the current limit value B3 (S23). If the brake pedal 9 is not pressed, the current limit state is shifted to the normal state in which the current is lower than a current limit value N3 (S4).

The current limit value B3 is larger than the current limit value A3 and smaller than the current limit value N3. The current limit value N3 may be, for example, the same value as the current limit value N of the first embodiment. The current limit value A3 may be set, for example, to be a current upper limit value that can be provided in accordance with increased temperature at the timing of a temperature increase. The current limit value B3 may be set, for example, to such a current upper limit value that the operator does not have uncomfortable feeling due to a shortage of the braking force when the temperature is restored to normal and that the operator does not have uncomfortable feeling due to an increase of the braking force.

According to the third embodiment, as described, the condition for limiting the driving of the electric motor 16 is that the temperature of the electric motor 16 becomes higher than the first predetermined temperature value (threshold value 5 in FIG. 10). Furthermore, the condition for limiting the driving of the electric motor 16 is that the temperature of the master pressure control device 25 (three-phase motor drive circuit 25B) becomes higher than the second predetermined temperature value (threshold value 5 in FIG. 10). The condition for limiting the driving of the electric motor 16 is cancelled when the temperature of the electric motor 16 becomes equal to or lower than the fourth predetermined temperature value (threshold value 6 in FIG. 10). The condition for limiting the driving of the electric motor 16 is cancelled when the temperature of the master pressure control device 25 (three-phase motor circuit 25B) becomes equal to or lower than the fifth predetermined temperature value (threshold value 6 in FIG. 10). However, if the brake pedal 9 is operated when the condition for limiting the driving of the electric motor 16 is cancelled, the current for driving the electric motor 16 is set to the limit value (current limit value B3) that is larger than the limit value before the cancellation (current limit value A3) and smaller than the normal-time limit value (current limit value N3).

The third embodiment imposes the above-described current limitation. The third embodiment is not particularly different in basic operation from the first and second embodiments. Especially, according to the third embodiment, after the current is limited (main limitation) for the reason that the temperature of the electric motor 16 or of the master pressure control device 25 (three-phase motor drive circuit 25B) is increased higher than normal times, if the temperature is restored to the normal state while the brake pedal 9 is pressed, the current limit state is shifted from the limit state A3 to the limit state B3 (transitional limitation). Consequently, the rate of rise of the braking force is reduced, and the degree of the braking force is made smaller than normal times, to thereby solve the abrupt fluctuation of the braking force. Furthermore, a shortage of the braking force is repressed by setting the current limit value B3 to the current value necessary for outputting the predetermined braking force. This reduces the uncomfortable feeling given to the operator. It is also possible to reduce the heat amount in the motor coil of the electric motor 16 or in the three-phase motor drive circuit 25B by setting the current supplied from the vehicle power source 26 to the electric motor 16 to the current limit value B3 that is smaller than the current limit value N3 of the normal state. It is then possible to reduce a possibility that the temperature of the electric motor 16 or of the three-phase motor drive circuit 25B returns back to high temperature after the temperature of the electric motor 16 or of the three-phase motor drive circuit 25B is restored from high temperature.

The third embodiment is discussed, taking as an example a case in which both the temperature of the electric motor 16 and the temperature of the master pressure control device 25 (three-phase motor drive circuit 25B) are used for determination of the current limitation. Instead of using both the temperatures, it is also possible, for example, to use either the temperature of the electric actuator or the temperature of the control device (brake control device). In addition, the temperature of the power source device of the vehicle (vehicle power source 26) may be used for the determination of the current limitation. In other words, the driving of the electric actuator may be limited when the temperature of the power source device of the vehicle (vehicle power source 26) becomes higher than the third predetermined temperature value. In this case, too, after the current limitation (main limitation) is imposed for the reason that the temperature of the vehicle power source 26 is increased higher than normal times, when the temperature is restored to the normal state, if the brake pedal 9 is pressed, the current limitation (transitional limitation) is imposed. The "third predetermined temperature value" may be set, for example, to such a value that the temperature of the power source device of the vehicle (vehicle power source 26) might become excessive.

The first embodiment is discussed, taking as an example a case in which deceleration is produced in the vehicle by driving the electric motor 16 in accordance with the braking demand issued through the operation of the brake pedal 9, and furthermore, deceleration is produced in the vehicle by driving the electric motor 16 also in accordance with the braking demand made by the automatic brake command. Instead of the foregoing constitution, for example, deceleration may be produced in the vehicle in response to either the operation of the brake pedal 9 or the automatic brake command (for example, the automatic braking function may be omitted). The same applies to the second and third embodiments.

The first embodiment is discussed, taking as an example a case in which a brake control mechanism that drives the electric motor 16 in accordance with the braking demand to produce deceleration is the master pressure control mechanism 11 of the electric booster 10. Instead, the brake control mechanism may be the wheel pressure control mechanism 31 of the hydraulic pressure supply device (ESC) 30 as a brake control mechanism that drives the electric actuator in accordance with the braking demand to produce deceleration. In other words, any kind of brake control mechanism including an electric booster and a hydraulic pressure supply device may be utilized as long as the mechanism is a brake control mechanism that drives an electric actuator in accordance with a braking demand to produce deceleration. The same applies to the second and third embodiments.

The first and second embodiments are discussed, taking as an example a case in which the limitation on the driving of the electric motor 16 is imposed and cancelled in accordance with the state of voltage of the vehicle power source 26. The third embodiment is discussed, taking as an example a case in which the limitation on the driving of the electric motor 16 is imposed and cancelled in accordance with the state of temperature of the electric motor 16 and of the master pressure control device 25 (three-phase motor drive circuit 25B). The condition for limiting the driving of the electric actuator does not necessarily have to be the one described above. The condition may be a state amount other than voltage or temperature, that is, any kind of state amount that enables a determination of necessity for limitation on the driving of the electric actuator. Likewise, the condition for cancelling the limitation on the driving of the electric actuator also may be a state amount other than voltage or temperature, that is, any kind of state amount that enables a determination of necessity for cancellation of limitation on the driving of the electric actuator.

The first embodiment is discussed, taking as an example a case in which the electric motor 16 functioning as an electric actuator is a rotary motor. Instead, for example, the electric actuator may be a linear-motion motor (linear motor). In other words, the electric actuator that propels the piston (namely the primary piston 6A of the master cylinder 6) of the electric booster 10 (master pressure control mechanism 11) may be selected from various kinds of electric actuators. The same applies to the second and third embodiments. Needless to say, the embodiments exemplify the invention, and the configurations of the different embodiments may be partially replaced or combined with one another.

Considerable modes of the electric booster and the brake control device based on the above-discussed embodiments are, for example, as below.

(1) A first mode provides an electric booster comprising an input member configured to be advanced and retracted by operation of a brake pedal; a piston arranged in the input member so as to be relatively movable; an electric actuator configured to advance and retract the piston; and a control device configured to control driving of the electric actuator in accordance with amount of operation of the input member by the brake pedal. In the electric booster that generates hydraulic brake pressure in a master cylinder through the motion of the piston and supplies the hydraulic brake pressure to a hydraulic channel, the control device limits the driving of the electric actuator in accordance with the operation amount of the input member if a condition for limiting the driving of the electric actuator is satisfied. The control device makes current for driving the electric actuator in accordance with the operation amount of the input member higher than when the driving of the electric actuator is limited and yet lower than when the driving of the electric actuator is not limited if the condition for limiting the driving of the electric actuator is cancelled while the brake pedal is operated.

According to the first mode, while the driving of the electric actuator is limited (main limitation) in response to satisfaction of the condition for limiting the driving of the electric actuator, if the condition for limiting the driving of the electric actuator is cancelled while the brake pedal 9 is pressed, the control device restores the braking force while the current for driving the electric actuator is limited (transitional limitation). At this time, the current used during the transitional limitation is lower than when the driving of the electric actuator is not limited. It is therefore possible to reduce a rotational rate of the electric actuator and reduce a rate of rise of the braking force. In addition, it is also possible to reduce the degree of the braking force after the braking force rises. This represses the "abrupt fluctuation of the braking force" and the "excessive increase of the braking force" when the condition for limiting the driving of the electric actuator is cancelled during the operation of the brake pedal. This solves the uncomfortable feeling given to the operator. Furthermore, the current used during the transitional limitation is larger than when the driving of the electric actuator is limited (main limitation), and therefore generates a larger braking force than when the driving of the electric actuator is limited (main limitation). In such a case, if the current is limited to a value necessary for outputting a predetermined braking force, it is possible to repress a shortage of the braking force. Form this aspect, too, the operator's uncomfortable feeling can be solved. Even if the condition for limiting the driving of the electric actuator is cancelled, the current for driving the electric actuator is limited (transitional limitation), so that an impact on the power source can be reduced. This represses a possibility that the source voltage is decreased again, for example, when the voltage is restored from a temporary voltage decrease caused by malfunction of the power source.

(2) In a second mode according to the first mode, the condition for limiting the driving of the electric actuator is that the source voltage of the vehicle becomes lower than a first predetermined voltage value. According to the second mode, when the source voltage of the vehicle becomes lower than the first predetermined voltage value, the condition for limiting the driving of the electric actuator is satisfied, and the driving of the electric actuator is limited.

(3) In a third mode according to the first mode, the condition for limiting the driving of the electric actuator is that temperature of the electric actuator becomes higher than a first predetermined temperature value. According to the third mode, when the temperature of the electric actuator becomes higher than the first predetermined temperature value, the condition for limiting the driving of the electric actuator is satisfied, and the driving of the electric actuator is limited.

(4) In a fourth mode according to the first mode, the condition for limiting the driving of the electric actuator is that temperature of the control device becomes higher than a second predetermined temperature value. According to the fourth mode, when the temperature of the control device becomes higher than the second predetermined temperature value, the condition for limiting the driving of the electric actuator is satisfied, and the driving of the electric actuator is limited.

(5) In a fifth mode according to the first mode, the condition for limiting the driving of the electric actuator is that temperature of a power source device of the vehicle becomes higher than a third predetermined temperature value. According to the fifth mode, when the temperature of the power source device of the vehicle becomes higher than the third predetermined temperature, the condition for limiting the driving of the electric actuator is satisfied, and the driving of the electric actuator is limited.

(6) In a sixth mode according to the second mode, the condition for limiting the driving of the electric actuator is cancelled when the source voltage of the vehicle becomes equal to or higher than a second predetermined voltage value. According to the sixth mode, when the source voltage of the vehicle becomes equal to or higher than the second predetermined voltage value, the condition for limiting the driving of the electric actuator is cancelled. The control device therefore restores the braking force while the current for driving the electric actuator is limited (transitional limitation) if the source voltage of the vehicle becomes equal to or higher than the second predetermined value while the brake pedal is operated.

(7) A seventh mode provides a brake control device that drives an electric actuator in accordance with a braking demand, produces deceleration, and limits current supplied to the electric actuator in response to the braking demand to a predetermined current value or smaller if a condition for limiting driving of the electric actuator is satisfied. If the condition for limiting the driving of the electric actuator is cancelled while a brake pedal is operated, the current supplied to the electric actuator in response to the braking demand is made higher than the predetermined current value and yet lower than when the driving of the electric actuator is not limited.

According to the seventh mode, if the condition for limiting the driving of the electric actuator is cancelled during the operation of the brake pedal when the current supplied to the electric actuator is limited (mail limitation) to be equal to or lower than a predetermined current value in response to satisfaction of the condition for limiting the driving of the electric actuator, the braking force is restored while a value of the current supplied to the electric actuator is limited (transitional limitation). The current used during the transitional limitation is made lower than when the driving of the electric actuator is not limited. It is therefore possible to reduce a rotational rate of the electric actuator and reduce a rate of rise of the braking force. In addition, it is also possible to reduce the degree of the braking force after the rise of the braking force. This represses the "abrupt fluctuation of the braking force" and the "excessive increase of the braking force" when the condition for limiting the driving of the electric actuator is cancelled during the operation of the brake pedal. Consequently, the operator's uncomfortable feeling can be solved. Furthermore, the current used during the transitional limitation is made larger than a predetermined current value used when the driving of the electric actuator is limited (main limitation), and therefore generates a larger braking force than when the current is equal to or lower than the predetermined current value. In such a case, if the current is limited to a value necessary for outputting a predetermined braking force, a shortage of the braking force can be repressed. Form this aspect, too, the operator's uncomfortable feeling can be solved. Even if the condition for limiting the driving of the electric actuator is cancelled, since the value of the current supplied to the electric actuator is limited (transitional limitation), an impact on the power source can be reduced. This represses a possibility that the source voltage is decreased again, for example, when the voltage is restored from a temporary voltage decrease caused by malfunction of the power source.

(8) In an eighth mode according to the seventh mode, the condition for limiting the driving of the electric actuator is that the source voltage of the vehicle becomes lower than a first predetermined voltage value. According to the eighth mode, when the source voltage of the vehicle becomes lower than the first predetermined voltage value, the condition for limiting the driving of the electric actuator is satisfied, and the driving of the electric actuator is limited.

(9) In a ninth mode according to the seventh mode, the condition for limiting the driving of the electric actuator is that temperature of the electric actuator becomes higher than a first predetermined temperature value. According to the ninth mode, when the temperature of the electric actuator becomes higher than the first predetermined temperature value, the condition for limiting the driving of the electric actuator is satisfied, and the driving of the electric actuator is limited.

(10) In a tenth mode according to the seventh mode, the condition for limiting the driving of the electric actuator is that temperature of the brake control device becomes higher than a second predetermined temperature value. According to the tenth mode, when the temperature of the brake control device becomes higher than the second predetermined temperature value, the condition for limiting the driving of the electric actuator is satisfied, and the driving of the electric actuator is limited.

(11) In an eleventh mode according to the seventh mode, the condition for limiting the driving of the electric actuator is that temperature of a power source device of the vehicle becomes higher than a third predetermined temperature value. According to the eleventh mode, when the temperature of the power source device of the vehicle becomes higher than the third predetermined temperature value, the condition for limiting the driving of the electric actuator is satisfied, and the driving of the electric actuator is limited.

(12) In a twelfth mode according to the eighth mode, the condition for limiting the driving of the electric actuator is cancelled when the source voltage of the vehicle becomes equal to or higher than the second predetermined voltage value. According to the twelfth mode, when the source voltage of the vehicle becomes equal to or higher than the second predetermined voltage value, the condition for limiting the driving of the electric actuator is cancelled. Therefore, if the source voltage of the vehicle becomes equal to or higher than the second predetermined voltage value during the operation of the brake pedal, the braking force is restored while a value of the current supplied to the electric actuator is limited (transitional limitation).

The invention is not limited to the above-discussed embodiments and may be modified in various ways. For example, the embodiments are intended to describe the invention in detail for easy understanding and do not necessarily have to include all the configurations mentioned above. The configuration of each embodiment may be partially replaced with another configuration or incorporated with another configuration. It is also possible to incorporate, omit or replace a part of the configuration of one of the embodiments into, from or with the configuration of another one of the embodiments.

The present application claims priority under Japanese Patent Application No. 2017-227815 filed on Nov. 28, 2017. The entire disclosure of Japanese Patent Application No. 2017-227815 filed on Nov. 28, 2017 including the description, claims, drawings and abstract, is incorporated herein by reference in its entirety.

REFERENCE SIGN LIST 6 master cylinder
6A primary piston (piston)
7A primary pipe (hydraulic channel)
7B secondary pipe (hydraulic channel)
9 brake pedal
10 electric booster
13 input member
16 electric motor (electric actuator)
25 master pressure control device (control device, brake control device)
26 vehicle power source (vehicle's power source device)

The invention claimed is:

1. An electric booster, comprising:
an input member configured to be advanced and retracted by operation of a brake pedal;
a piston arranged in the input member so as to be relatively movable;
an electric actuator configured to advance and retract the piston; and
a control device configured to control driving of the electric actuator in accordance with an amount of displacement of the input member caused by operation of the brake pedal,
the piston being configured to move to generate hydraulic brake pressure in a master cylinder and supply the hydraulic brake pressure to a hydraulic channel,
the control device being configured to:
limit the driving of the electric actuator in accordance with the amount of displacement of the input member when a temporary abnormal condition is sensed in a vehicle, and
make current for driving the electric actuator in accordance with the amount of displacement of the input member higher than when the driving of the electric actuator is limited and lower than when the driving of the electric actuator is not limited if the vehicle is restored from the temporary abnormal condition of the vehicle to a normal condition during operation of the brake pedal.

2. The electric booster according to claim 1,
wherein the temporary abnormal condition of the vehicle is that the source voltage of the vehicle becomes lower than a normal voltage value.

3. The electric booster according to claim 1,
wherein the temporary abnormal condition of the vehicle is that temperature of the electric actuator becomes higher than a normal temperature value.

4. The electric booster according to claim 1,
wherein the temporary abnormal condition of the vehicle is that temperature of the control device becomes higher than a normal temperature value.

5. The electric booster according to claim 1,
wherein the temporary abnormal condition of the vehicle is that temperature of a power source device of the vehicle becomes higher than a normal temperature value.

6. The electric booster according to claim 2,
wherein the control device decides that the vehicle is restored from the temporary abnormal condition of the vehicle when the source voltage of the vehicle being restored to the normal voltage value is sensed.

7. A brake control device,
the brake control device being configured to drive an electric actuator in accordance with a braking demand, produce deceleration, and limit current supplied to the electric actuator in response to the braking demand to a predetermined current value or smaller when a temporary abnormal condition is sensed in a vehicle,
the brake control device being configured to make the current supplied to the electric actuator in response to the braking demand higher than the predetermined current value and lower than when the driving of the electric actuator is not limited if the vehicle is restored from the temporary abnormal condition of the vehicle to a normal condition during operation of a brake pedal.

8. The brake control device according to claim 7,
wherein the temporary abnormal condition of the vehicle is that the source voltage of the vehicle becomes lower than a normal voltage value.

9. The brake control device according to claim 7,
wherein the temporary abnormal condition of the vehicle is that temperature of the electric actuator becomes higher than a normal temperature value.

10. The brake control device according to claim 7,
wherein the temporary abnormal condition of the vehicle is that temperature of the brake control device becomes higher than a normal temperature value.

11. The brake control device according to claim 7,
wherein the temporary abnormal condition of the vehicle is that temperature of a power source device of the vehicle becomes higher than a normal temperature value.

12. The brake control device according to claim 8,
wherein the vehicle is restored from the temporary abnormal condition to the normal condition of the vehicle is decided when the source voltage of the vehicle being restored to the normal voltage value is sensed.

* * * * *